US012663622B2

(12) United States Patent
Kitada

(10) Patent No.: US 12,663,622 B2
(45) Date of Patent: Jun. 23, 2026

(54) ZOOM LENS SYSTEM, AND IMAGE CAPTURE DEVICE AND INTERCHANGEABLE LENS UNIT INCLUDING THE ZOOM LENS SYSTEM

(71) Applicant: Panasonic Intellectual Property Management Co., Ltd., Osaka (JP)

(72) Inventor: Takahiro Kitada, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 292 days.

(21) Appl. No.: 18/532,417

(22) Filed: Dec. 7, 2023

(65) Prior Publication Data

US 2024/0192475 A1 Jun. 13, 2024

(30) Foreign Application Priority Data

Dec. 8, 2022 (JP) ................................. 2022-196022

(51) Int. Cl.
*G02B 15/14* (2006.01)
*G02B 7/14* (2021.01)
(52) U.S. Cl.
CPC ....... *G02B 15/144503* (2019.08); *G02B 7/14* (2013.01)
(58) Field of Classification Search
CPC ................ G02B 9/34–58; G02B 13/04; G02B 14/146–1465

USPC ......... 359/682, 686–688, 747, 753, 771–783
See application file for complete search history.

(56) References Cited

U.S. PATENT DOCUMENTS

2021/0132346 A1* 5/2021 Kitada .............. G02B 27/0025

FOREIGN PATENT DOCUMENTS

JP 2019-133072 8/2019

OTHER PUBLICATIONS

Gross, "Handbook of Optical Systems", vol. 3: Aberration Theory and Correction of Optical Systems. (Year: 2007).*

* cited by examiner

*Primary Examiner* — Jessica M Merlin
(74) *Attorney, Agent, or Firm* — Wenderoth, Lind & Ponack, L.L.P.

(57) ABSTRACT

A zoom lens system includes multiple lens groups and an aperture stop. The multiple lens groups consist of: a first lens group having negative power; a second lens group having positive power, a third lens group having negative power; and a fourth lens group having negative power. The aperture stop is disposed between the first and second lens groups. The zoom lens system satisfies 0.5<fw/BFw<1.5, where fw is a focal length of the zoom lens system at a wide-angle end and BFw is a back focus of the zoom lens system at the wide-angle end.

10 Claims, 12 Drawing Sheets

ZOOM LENS SYSTEM, AND IMAGE CAPTURE DEVICE AND INTERCHANGEABLE LENS UNIT INCLUDING THE ZOOM LENS SYSTEM

CROSS-REFERENCE TO RELATED APPLICATIONS

The present application is based on, and claims the benefit of foreign priority to, Japanese Patent Application No. 2022-196022, filed on Dec. 8, 2022, the entire contents of which are hereby incorporated by reference.

TECHNICAL FIELD

The present disclosure relates to a zoom lens system having the ability to compensate for various types of aberrations sufficiently over the entire zoom range, and also relates to an image capture device and interchangeable lens unit including such a zoom lens system.

BACKGROUND ART

JP 2019-133072 A discloses a zoom lens including a first lens group having negative refractive power, a second lens group having positive refractive power, a third lens group having negative refractive power, and a fourth lens group having positive refractive power. The first, second, third, and fourth lens groups are arranged in this order such that the first lens group is located closer to an object than any of the other second, third, and fourth lens groups is, and that the fourth lens group is located closer to an image plane than any of the other first, second, and third lens groups is. The zoom lens changes the zoom power from a wide-angle end toward a telephoto end by changing the interval on the optical axis between the respective lens groups. The zoom lens performs focusing by moving the third lens group along the optical axis.

SUMMARY

The present disclosure provides a zoom lens system having the ability to compensate for various types of aberrations sufficiently over the entire zoom range and an image capture device and interchangeable lens unit including such a zoom lens system.

A zoom lens system according to an aspect of the present disclosure includes multiple lens groups and an aperture stop. The multiple lens groups consist of: a first lens group having negative power; a second lens group having positive power; a third lens group having negative power; and a fourth lens group having negative power. The first, second, third, and fourth lens groups are arranged in this order such that the first lens group is located closer to an object than any of the second, third, or fourth lens group is, and that the fourth lens group is located closer to an image plane than any of the first, second, or third lens group is. The aperture stop is disposed between the first lens group and the second lens group. An interval between each pair of lens groups that are adjacent to each other among the multiple lens groups changes as the first, second, third, and fourth lens groups move along an optical axis of the zoom lens system while the zoom lens system is zooming. The third lens group moves along the optical axis while the zoom lens system is focusing to make a transition from an infinity in-focus state toward a close-object in-focus state. The zoom lens system satisfies the following inequality (1):

$$0.5 < fw/BFw < 1.5 \qquad (1)$$

where fw is a focal length of the zoom lens system at a wide-angle end and BFw is a back focus of the zoom lens system at the wide-angle end.

An image capture device according to another aspect of the present disclosure transforms an optical image of an object into an electrical image signal and outputs the electrical image signal thus transformed. The image capture device includes: a zoom lens system that forms the optical image of the object; and an image sensor that transforms the optical image formed by the zoom lens system into the electrical image signal. The zoom lens system includes multiple lens groups that consist of: a first lens group having negative power; a second lens group having positive power; a third lens group having negative power; and a fourth lens group having negative power. The first, second, third, and fourth lens groups are arranged in this order such that the first lens group is located closer to the object than any of the second, third, or fourth lens group is, and that the fourth lens group is located closer to an image plane than any of the first, second, or third lens group is. An interval between each pair of lens groups that are adjacent to each other among the multiple lens groups changes as the first, second, third, and fourth lens groups move along an optical axis of the zoom lens system while the zoom lens system is zooming. The third lens group moves along the optical axis while the zoom lens system is focusing to make a transition from an infinity in-focus state toward a close-object in-focus state. The zoom lens system satisfies the following inequality (1):

$$0.5 < fw/BFw < 1.5 \qquad (1)$$

where fw is a focal length of the zoom lens system at a wide-angle end and BFw is a back focus of the zoom lens system at the wide-angle end.

An interchangeable lens unit according to still another aspect of the present disclosure is removably connected, via a mount, to a camera body. The camera body includes: an image sensor that receives an optical image and transforms the optical image into an electrical image signal; and the mount. The interchangeable lens unit forms an optical image of an object on the image sensor. The interchangeable lens unit includes a zoom lens system. The zoom lens system includes multiple lens groups that consist of: a first lens group having negative power; a second lens group having positive power; a third lens group having negative power; and a fourth lens group having negative power. The first, second, third, and fourth lens groups are arranged in this order such that the first lens group is located closer to the object than any of the second, third, or fourth lens group is, and that the fourth lens group is located closer to an image plane than any of the first, second, or third lens group is. An interval between each pair of lens groups that are adjacent to each other among the multiple lens groups changes as the first, second, third, and fourth lens groups move along an optical axis of the zoom lens system while the zoom lens system is zooming. The third lens group moves along the optical axis while the zoom lens system is focusing to make a transition from an infinity in-focus state toward a close-object in-focus state. The zoom lens system satisfies the following inequality (1):

$$0.5 < fw/BFw < 1.5 \qquad (1)$$

where fw is a focal length of the zoom lens system at a wide-angle end and BFw is a back focus of the zoom lens system at the wide-angle end.

BRIEF DESCRIPTION OF DRAWINGS

The figures depict one or more implementations in accordance with the present teaching, by way of example only, not by way of limitations. In the figures, like reference numerals refer to the same or similar elements.

DETAILED DESCRIPTION

Figure 1:
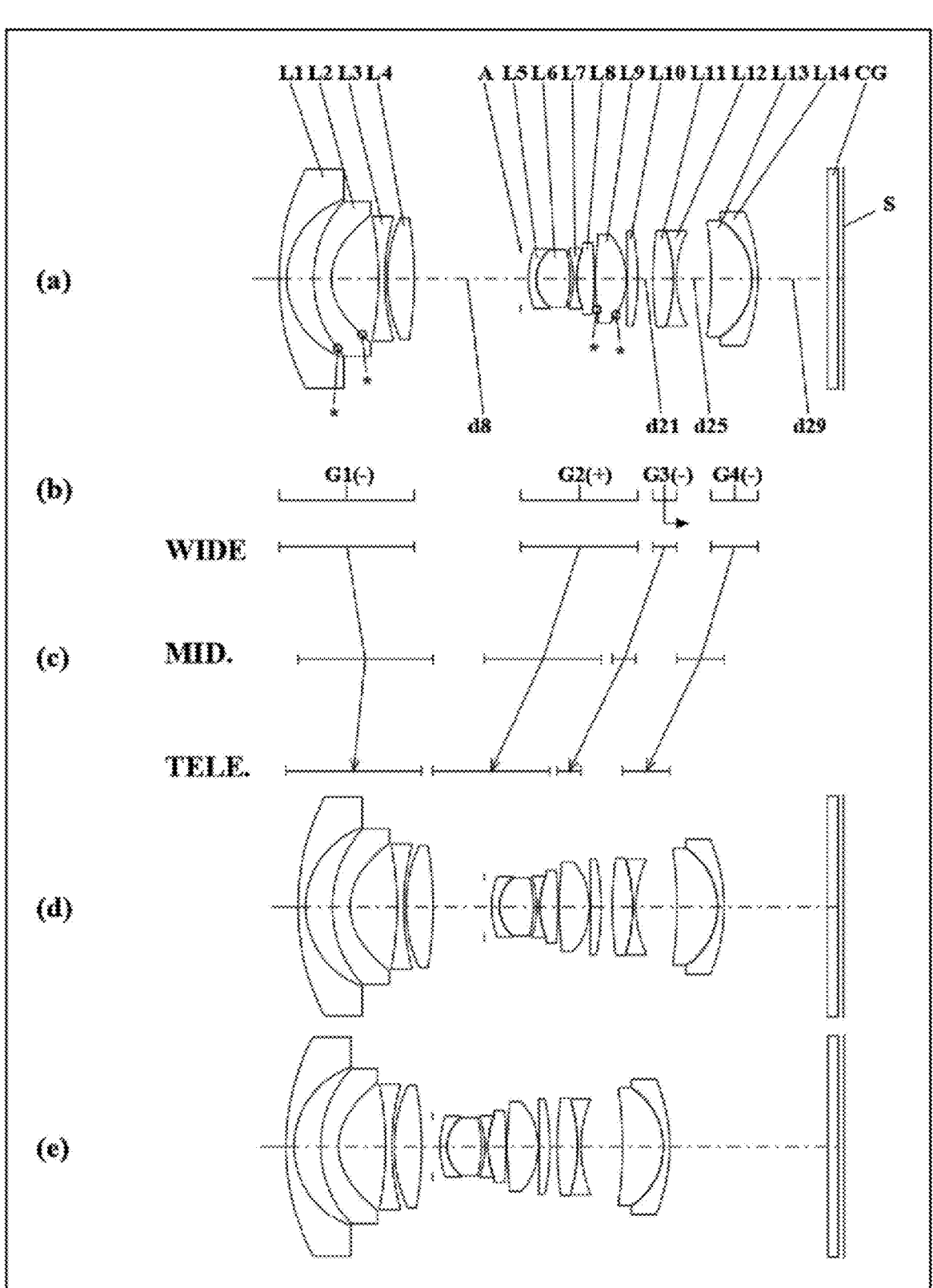
FIG. 1 illustrates lens arrangements showing an infinity in-focus state of a zoom lens system according to a first embodiment (corresponding to a first example of numerical values)
Figure 2:
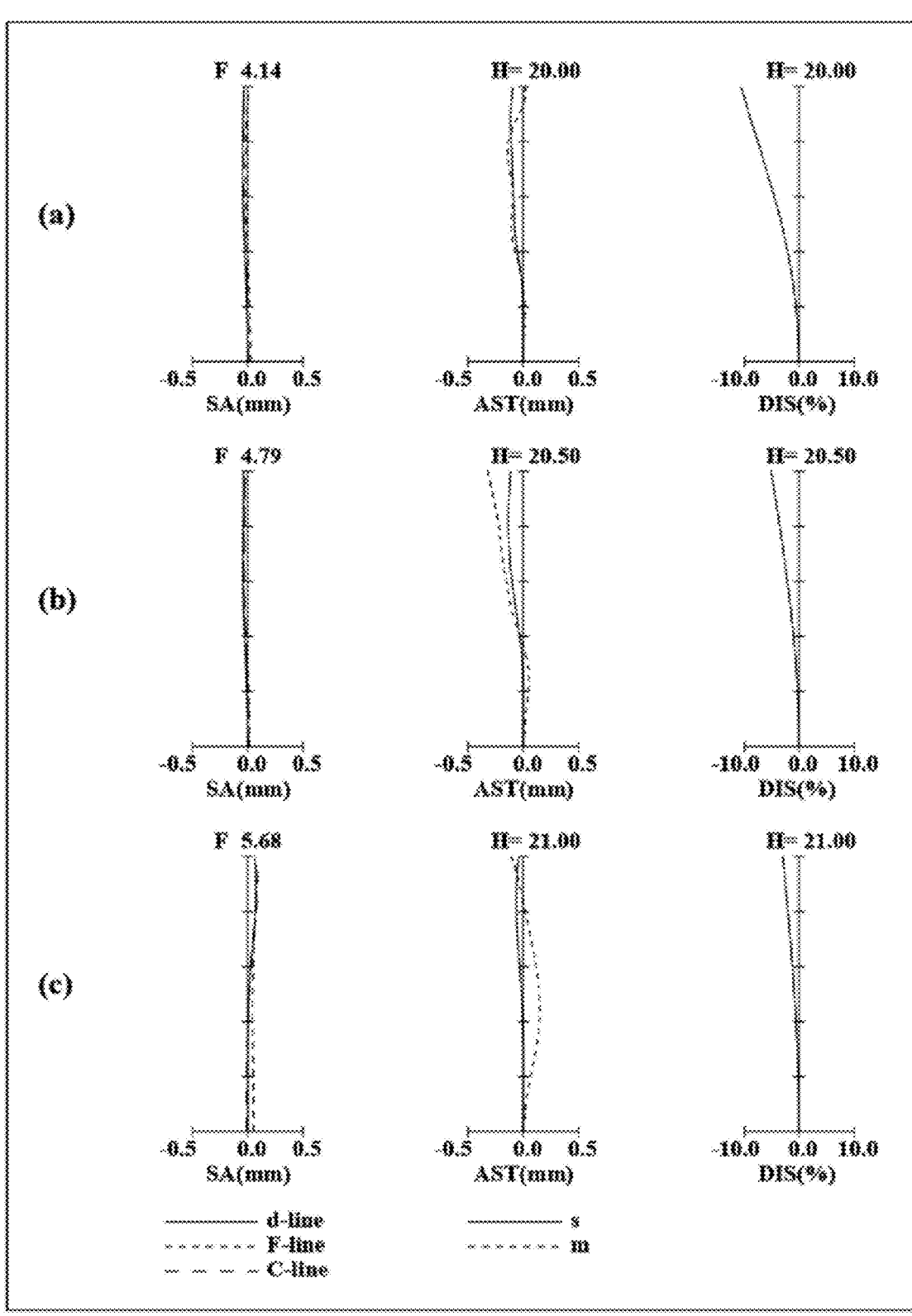
FIG. 2 illustrates longitudinal aberration diagrams showing the infinity in-focus state of the zoom lens system in the first example of numerical values.

Embodiments of the present disclosure will now be described in detail with reference to the accompanying drawings as needed. Note that unnecessarily detailed description will be omitted. For example, detailed description of already well-known matters and redundant description of substantially the same configuration will be omitted. This is done to avoid making the following description overly redundant and thereby help one of ordinary skill in the art understand the present disclosure easily.

It should also be noted that the accompanying drawings and the following description are provided by the applicant to help one of ordinary skill in the art understand the present disclosure fully and should not be construed as limiting the scope of the present disclosure, which is defined by the appended claims.

First to Fifth Embodiments

Zoom lens systems according to first to fifth embodiments will now be described on an individual basis with reference to the accompanying drawings.

FIGS. 1, 3, 5, 7, and 9 illustrate lens arrangement diagrams for zoom lens systems according to first, second, third, fourth, and fifth embodiments, respectively, each showing a zoom lens system in an infinity in-focus state.

In FIGS. 1, 3, 5, 7, and 9, portion (a) illustrates a lens arrangement at a wide-angle end (which is a state with the shortest focal length fw); portion (d) illustrates a lens arrangement at a middle position (which is a state with a middle focal length $fM=\sqrt{(fw*fT)}$); and portion (e) illustrates a lens arrangement at the telephoto end (which is a state with the longest focal length fT). Note that portions (a), (d), and (e) of FIGS. 1, 3, 5, 7, and 9 have the same aspect ratio.

Furthermore, in portion (a) of FIGS. 1, 3, 5, 7, and 9, the asterisk (*) attached to a surface of a particular lens indicates that the surface is an aspheric surface. Note that in the lenses shown in portion (a) of FIGS. 1, 3, 5, 7, and 9, an object-side surface or an image-side surface having no asterisks is a spherical surface.

Also, in FIGS. 1, 3, 5, 7, and 9, the polygon arrows shown in portion (c) thereof each connect together the respective positions of the lens groups at the wide-angle end (Wide), middle position (Mid), and telephoto end (Tele) from top to bottom. Note that these polygon arrows just connect the wide-angle end to the middle position and the middle position to the telephoto end with the lines, and do not indicate the actual movement of the lens groups.

Furthermore, in portion (b) of FIGS. 1, 3, 5, 7, and 9, the respective lens groups are designated by the reference signs G1-G4 corresponding to their respective positions shown in portion (a).

Furthermore, the signs (+) and (−) added to the reference signs G1-G4 of the respective lens groups in portion (b) of FIGS. 1, 3, 5, 7, and 9 indicate the powers of the respective lens groups G1-G4. That is to say, the positive sign (+) indicates positive power, and the negative sign (−) indicates negative power.

Also, the arrows added to the lens groups in portion (c) of FIGS. 1, 3, 5, 7, and 9 each indicate focusing to make a transition from the infinity in-focus state toward the close-object in-focus state. Note that in FIGS. 1, 3, 5, 7, and 9, the reference signs of respective lens groups are shown under the respective lens groups in portion (a) thereof, and therefore, an arrow indicating focusing is shown under the sign of each lens group for convenience's sake. In each zooming state, the directions of movement of the respective lens groups during focusing will be described more specifically later with respect to each of the first through fifth embodiments.

Furthermore, in portions (a), (d), and (e) of FIGS. 1, 3, 5, 7, and 9, the straight line drawn at the right end indicates the position of the image plane S (i.e., a surface, facing the object, of the image sensor). Therefore, the left end of the drawings corresponds to the object side. Furthermore, a parallel plate CG such as a low-pass filter or cover glass is disposed between the lens group on the last stage, facing the image plane S, of the zoom lens system and the image plane S.

First Embodiment

FIG. 1 illustrates a zoom lens system according to a first embodiment.

The zoom lens system includes multiple lens groups that consist of: a first lens group G1 having negative power; a second lens group G2 having positive power; a third lens group G3 having negative power; and a fourth lens group G4 having negative power. The first, second, third, and fourth lens groups G1, G2, G3, G4 are arranged in this order such that the first lens group G1 is located closer to an object than any of the second, third, or fourth lens group G2, G3, G4 is and that the fourth lens group G4 is located closer to an image plane than any of the first, second, or third lens group G1, G2, G3 is.

The zoom lens system forms an image at a point on the image plane S.

The first lens group G1 is made up of: a first lens L1 having negative power; a second lens L2 having negative power; a third lens L3 having negative power; and a fourth lens L4 having positive power. The first lens L1, the second lens L2, the third lens L3, and the fourth lens L4 are arranged in this order such that the first lens L1 is located closer to the object than any other member of this first lens group G1 is and that the fourth lens L4 is located closer to the image plane than any other member of this first lens group G1 is. In this case, the first lens L1 is an example of the negative lens G1L1, the second lens L2 is an example of the negative lens GIL2, and the third lens L3 is an example of the negative lens GIL3.

An aperture stop A is disposed between the first lens group G1 and the second lens group G2.

The second lens group G2 is made up of: a fifth lens L5 having negative power; a sixth lens L6 having positive power; a seventh lens L7 having negative power; an eighth lens L8 having positive power; a ninth lens L9 having positive power; and a tenth lens L10 having positive power. The fifth, sixth, seventh, eighth, ninth, and tenth lenses L5, L6, L7, L8, L9, L10 are arranged in this order such that the fifth lens L5 is located closer to the object than any other member of this second lens group G2 is and that the tenth lens L10 is located closer to the image plane than any other member of this second lens group G2 is. The fifth lens L5 and the sixth lens L6 are bonded together with an adhesive, for example, to form a bonded lens. That is to say, the bonded lens includes the fifth lens L5 and the sixth lens L6. The seventh lens L7 and the eighth lens L8 are bonded together with an adhesive, for example, to form a bonded lens. That is to say, the bonded lens includes the seventh lens L7 and the eighth lens L8.

The third lens group G3 is made up of an eleventh lens L11 having positive power and a twelfth lens L12 having negative power. The eleventh lens L11 and the twelfth lens L12 are arranged in this order such that the eleventh lens L11 is located closer to the object than the twelfth lens L12 is and that the twelfth lens L12 is located closer to the image plane than the eleventh lens L11 is. The eleventh lens L11 and the twelfth lens L12 are bonded together with an adhesive, for example, to form a bonded lens. That is to say, the bonded lens includes the eleventh lens L11 and the twelfth lens L12. In this case, the eleventh lens L11 is an example of the positive lens LG3p.

The fourth lens group G4 is made up of a thirteenth lens L13 having positive power and a fourteenth lens L14 having negative power. The thirteenth lens L13 and the fourteenth lens L14 are arranged in this order such that the thirteenth lens L13 is located closer to the object than the fourteenth lens L14 is and that the fourteenth lens L14 is located closer to the image plane than the thirteenth lens L13 is. The thirteenth lens L13 and the fourteenth lens L14 are bonded together with an adhesive, for example, to form a bonded lens. That is to say, the bonded lens includes the thirteenth lens L13 and the fourteenth lens L14. In this case, the thirteenth lens L13 is an example of the positive lens LG4p.

The respective lenses will be described.

First, the respective lenses that form the first lens group G1 will be described. The first lens L1 is a meniscus lens having a convex surface facing the object. The second lens L2 is a meniscus lens having a convex surface facing the object. The third lens L3 is a biconcave lens. The fourth lens L4 is a biconvex lens. Both surfaces of the second lens L2 have an aspheric shape.

Next, the respective lenses that form the second lens group G2 will be described. The fifth lens L5 is a meniscus lens having a convex surface facing the object. The sixth lens L6 is a biconvex lens. The seventh lens L7 is a biconcave lens. The eighth lens L8 is a biconvex lens. The ninth lens L9 is a biconvex lens. The tenth lens L10 is a meniscus lens having a convex surface facing the image plane. Both surfaces of the ninth lens L9 have an aspheric shape.

Next, the respective lenses that form the third lens group G3 will be described. The eleventh lens L11 is a biconvex lens. The twelfth lens L12 is a biconcave lens.

Next, the respective lenses that form the fourth lens group G4 will be described. The thirteenth lens L13 is a meniscus lens having a convex surface facing the image plane. The fourteenth lens L14 is a meniscus lens having a convex surface facing the image plane.

While the zoom lens system according to the first embodiment is zooming from the wide-angle end toward the telephoto end during a shooting session, the first lens group G1 moves to draw a locus that is convex toward the image plane S and the second lens group G2, the third lens group G3, and the fourth lens group G4 move toward the object with respect to the image plane S. In addition, as the zoom lens system is zooming, the first, second, third, and fourth lens groups G1, G2, G3, G4 move along the optical axis such that the interval between the first lens group G1 and the second lens group G2 decreases, the interval between the second lens group G2 and the third lens group G3 decreases, the interval between the third lens group G3 and the fourth lens group G4 increases, and the interval between the fourth lens group G4 and the image plane S increases.

While the zoom lens system according to the first embodiment is focusing to make a transition from the infinity in-focus state toward the close-object in-focus state, the third lens group G3 moves along the optical axis toward the image plane S.

Second Embodiment

Figure 3:
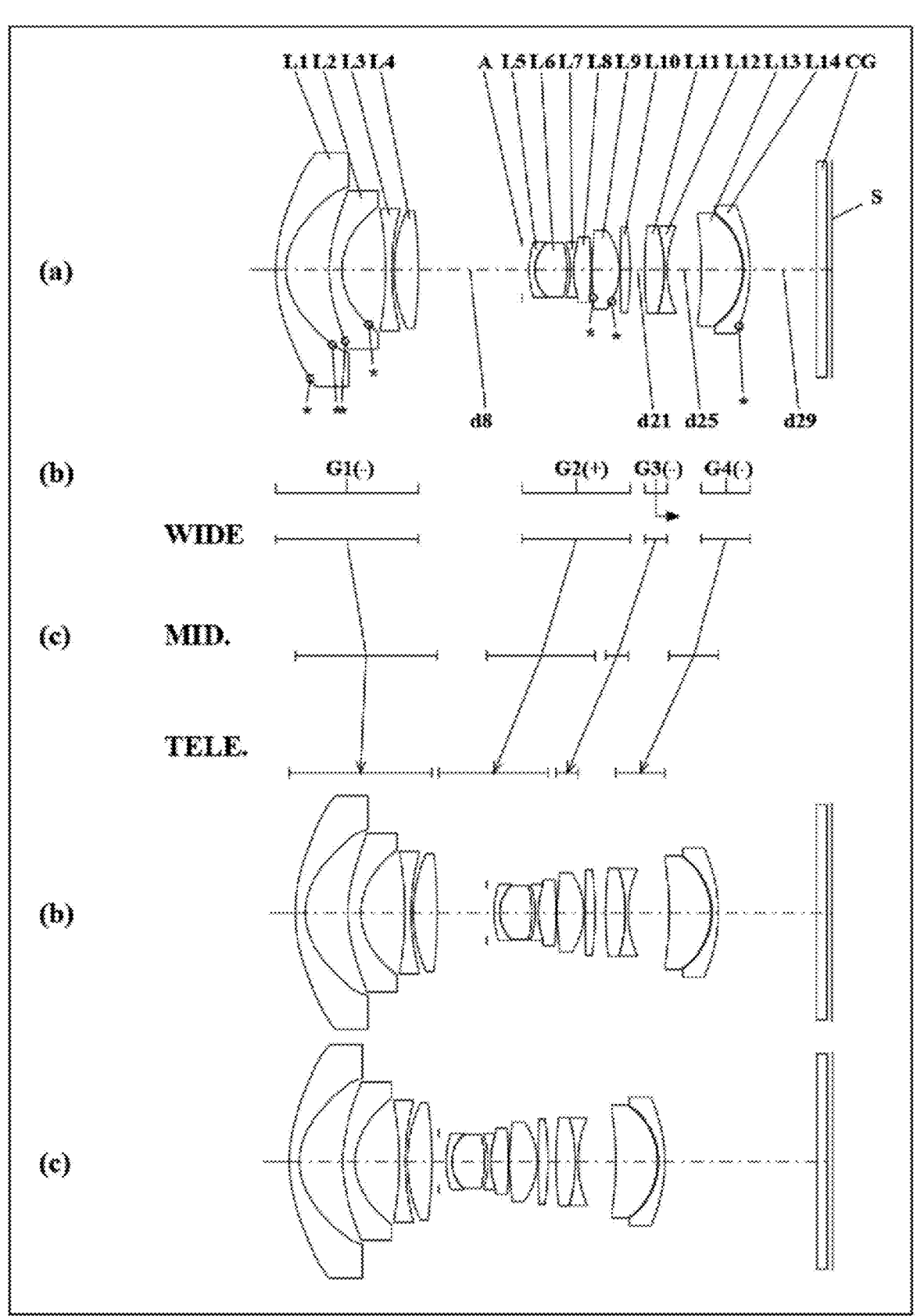
FIG. 3 illustrates lens arrangements showing an infinity in-focus state of a zoom lens system according to a second embodiment (corresponding to a second example of numerical values)
Figure 4:
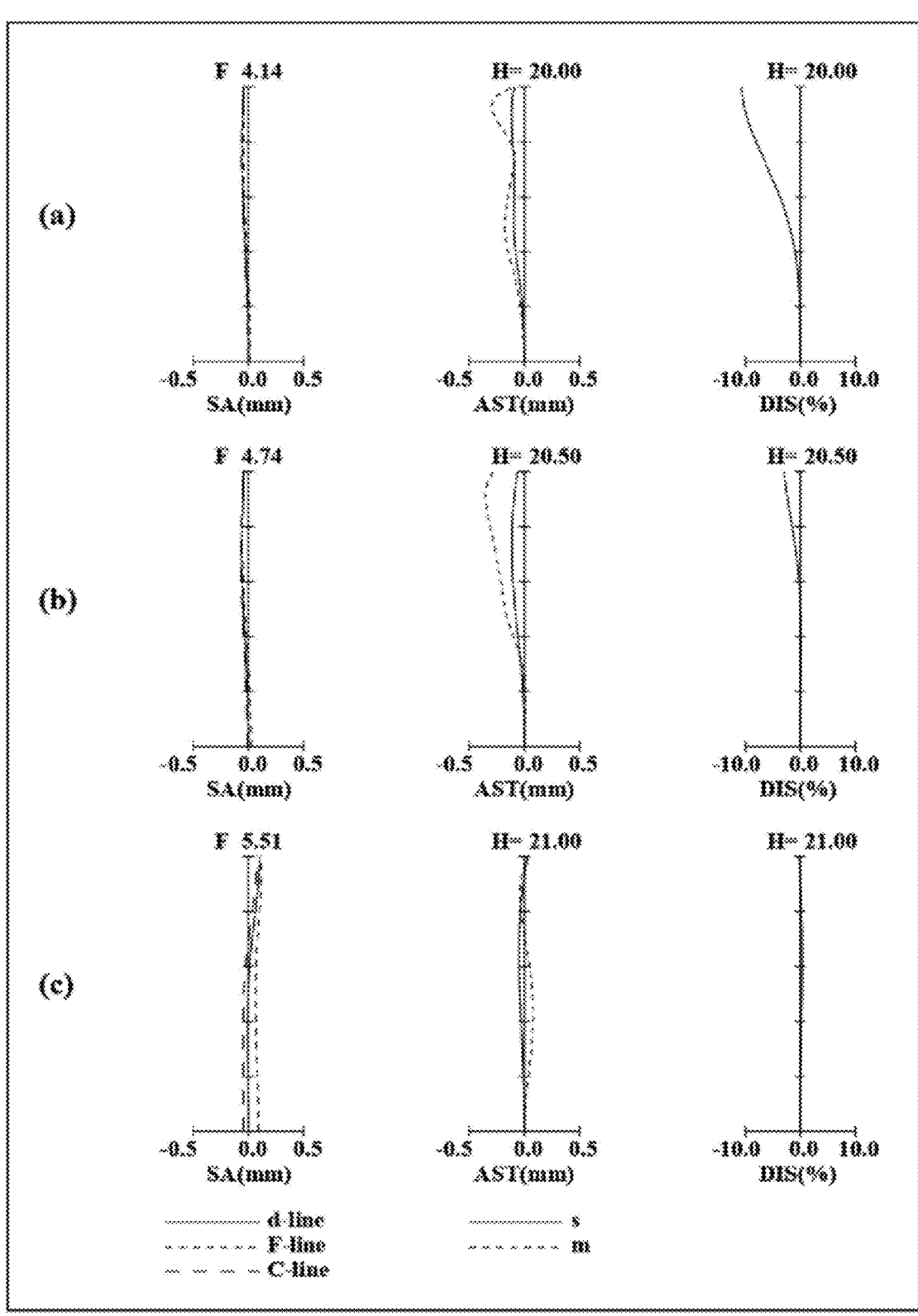
FIG. 4 illustrates longitudinal aberration diagrams showing the infinity in-focus state of the zoom lens system in the second example of numerical values.

FIG. 3 illustrates a zoom lens system according to a second embodiment.

The zoom lens system includes multiple lens groups that consist of: a first lens group G1 having negative power; a second lens group G2 having positive power; a third lens group G3 having negative power; and a fourth lens group G4 having negative power. The first, second, third, and fourth lens groups G1, G2, G3, G4 are arranged in this order such that the first lens group G1 is located closer to an object than any of the second, third, or fourth lens group G2, G3, G4 is and that the fourth lens group G4 is located closer to an image plane than any of the first, second, or third lens group G1, G2, G3 is.

The zoom lens system forms an image at a point on the image plane S.

The first lens group G1 is made up of: a first lens L1 having negative power; a second lens L2 having negative power; a third lens L3 having negative power; and a fourth lens L4 having positive power. The first lens L1, the second lens L2, the third lens L3, and the fourth lens L4 are arranged in this order such that the first lens L1 is located closer to the object than any other member of this first lens group G1 is and that the fourth lens L4 is located closer to the image plane than any other member of this first lens group G1 is. In this case, the first lens L1 is an example of the negative lens G1L1, the second lens L2 is an example of the negative lens GIL2, and the third lens L3 is an example of the negative lens GIL3.

An aperture stop A is disposed between the first lens group G1 and the second lens group G2.

The second lens group G2 is made up of: a fifth lens L5 having negative power; a sixth lens L6 having positive power; a seventh lens L7 having negative power; an eighth lens L8 having positive power; a ninth lens L9 having positive power; and a tenth lens L10 having positive power. The fifth, sixth, seventh, eighth, ninth, and tenth lenses L5, L6, L7, L8, L9, L10 are arranged in this order such that the fifth lens L5 is located closer to the object than any other member of this second lens group G2 is and that the tenth lens L10 is located closer to the image plane than any other member of this second lens group G2 is. The fifth lens L5 and the sixth lens L6 are bonded together with an adhesive, for example, to form a bonded lens. That is to say, the bonded lens includes the fifth lens L5 and the sixth lens L6. The seventh lens L7 and the eighth lens L8 are bonded together with an adhesive, for example, to form a bonded lens. That is to say, the bonded lens includes the seventh lens L7 and the eighth lens L8.

The third lens group G3 is made up of an eleventh lens L11 having positive power and a twelfth lens L12 having negative power. The eleventh lens L11 and the twelfth lens L12 are arranged in this order such that the eleventh lens L11 is located closer to the object than the twelfth lens L12 is and that the twelfth lens L12 is located closer to the image plane than the eleventh lens L11 is. The eleventh lens L11 and the twelfth lens L12 are bonded together with an adhesive, for example, to form a bonded lens. That is to say, the bonded lens includes the eleventh lens L11 and the twelfth lens L12. In this case, the eleventh lens L11 is an example of the positive lens LG3p.

The fourth lens group G4 is made up of a thirteenth lens L13 having positive power and a fourteenth lens L14 having negative power. The thirteenth lens L13 and the fourteenth lens L14 are arranged in this order such that the thirteenth lens L13 is located closer to the object than the fourteenth lens L14 is, and that the fourteenth lens L14 is located closer to the image plane than the thirteenth lens L13 is. In this case, the thirteenth lens L13 is an example of the positive lens LG4p.

The respective lenses will be described.

First, the respective lenses that form the first lens group G1 will be described. The first lens L1 is a meniscus lens having a convex surface facing the object. The second lens L2 is a meniscus lens having a convex surface facing the object. The third lens L3 is a biconcave lens. The fourth lens L4 is a biconvex lens. Both surfaces of the first lens L1 have an aspheric shape. Both surfaces of the second lens L2 have an aspheric shape Next, the respective lenses that form the second lens group G2 will be described. The fifth lens L5 is a meniscus lens having a convex surface facing the object. The sixth lens L6 is a biconvex lens. The seventh lens L7 is a biconcave lens. The eighth lens L8 is a biconvex lens. The ninth lens L9 is a biconvex lens. The tenth lens L10 is a biconvex lens. Both surfaces of the ninth lens L9 have an aspheric shape.

Next, the respective lenses that form the third lens group G3 will be described. The eleventh lens L11 is a biconvex lens. The twelfth lens L12 is a biconcave lens.

Next, the respective lenses that form the fourth lens group G4 will be described. The thirteenth lens L13 is a meniscus lens having a convex surface facing the image plane. The fourteenth lens L14 is a meniscus lens having a convex surface facing the image plane. The image-side surface of the fourteenth lens L14 has an aspheric shape.

While the zoom lens system according to the second embodiment is zooming from the wide-angle end toward the telephoto end during a shooting session, the first lens group G1 moves to draw a locus that is convex toward the image plane S and the second lens group G2, the third lens group G3, and the fourth lens group G4 move toward the object with respect to the image plane S. In addition, as the zoom lens system is zooming, the first, second, third, and fourth lens groups G1, G2, G3, G4 move along the optical axis such that the interval between the first lens group G1 and the second lens group G2 decreases, the interval between the second lens group G2 and the third lens group G3 decreases, the interval between the third lens group G3 and the fourth lens group G4 increases from the wide-angle end through the middle position and decreases from the middle position through the telephoto end, and the interval between the fourth lens group G4 and the image plane S increases.

While the zoom lens system according to the second embodiment is focusing to make a transition from the infinity in-focus state toward the close-object in-focus state, the third lens group G3 moves along the optical axis toward the image plane S.

Third Embodiment

Figure 5:
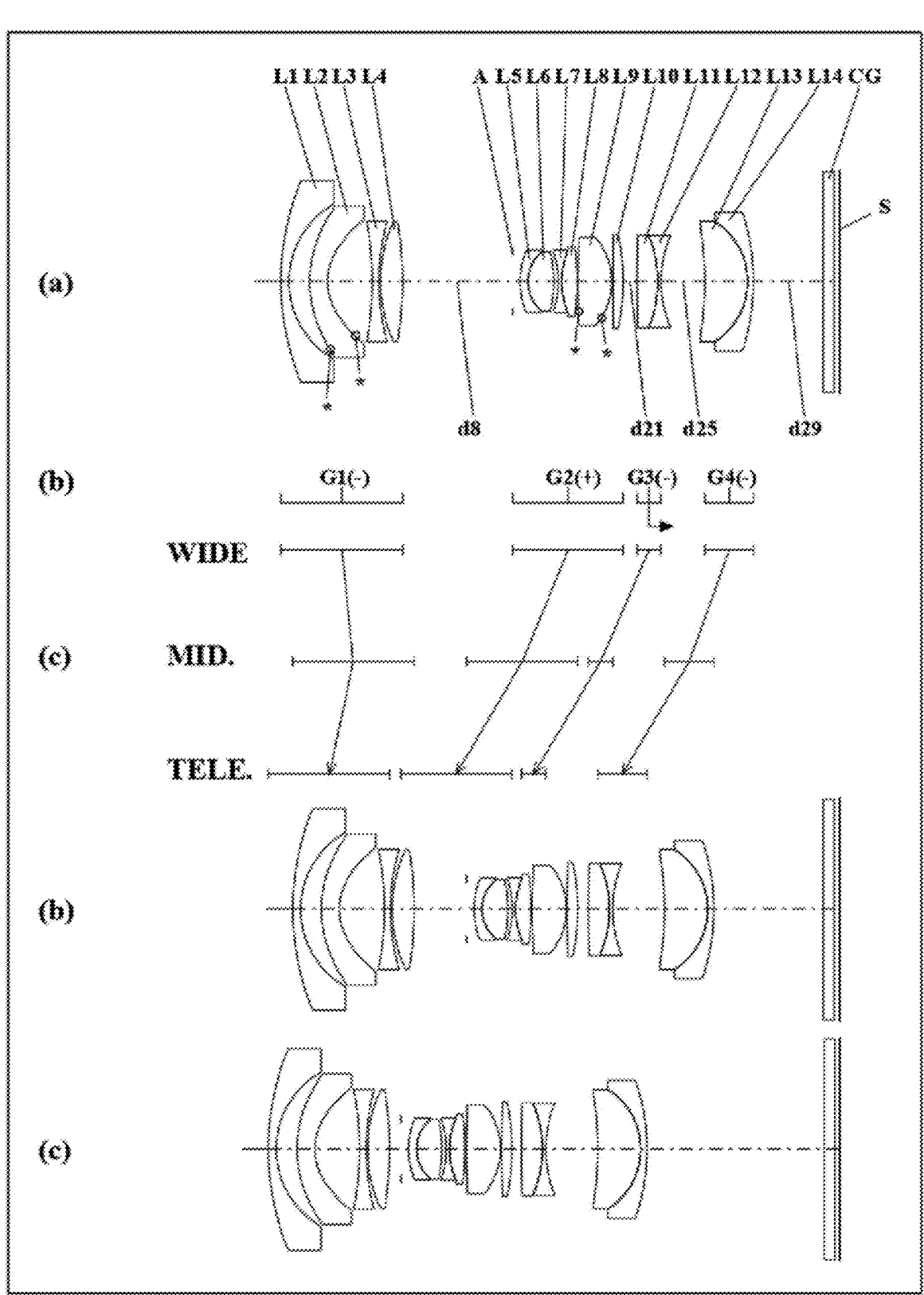
FIG. 5 illustrates lens arrangements showing an infinity in-focus state of a zoom lens system according to a third embodiment (corresponding to a third example of numerical values)
Figure 6:
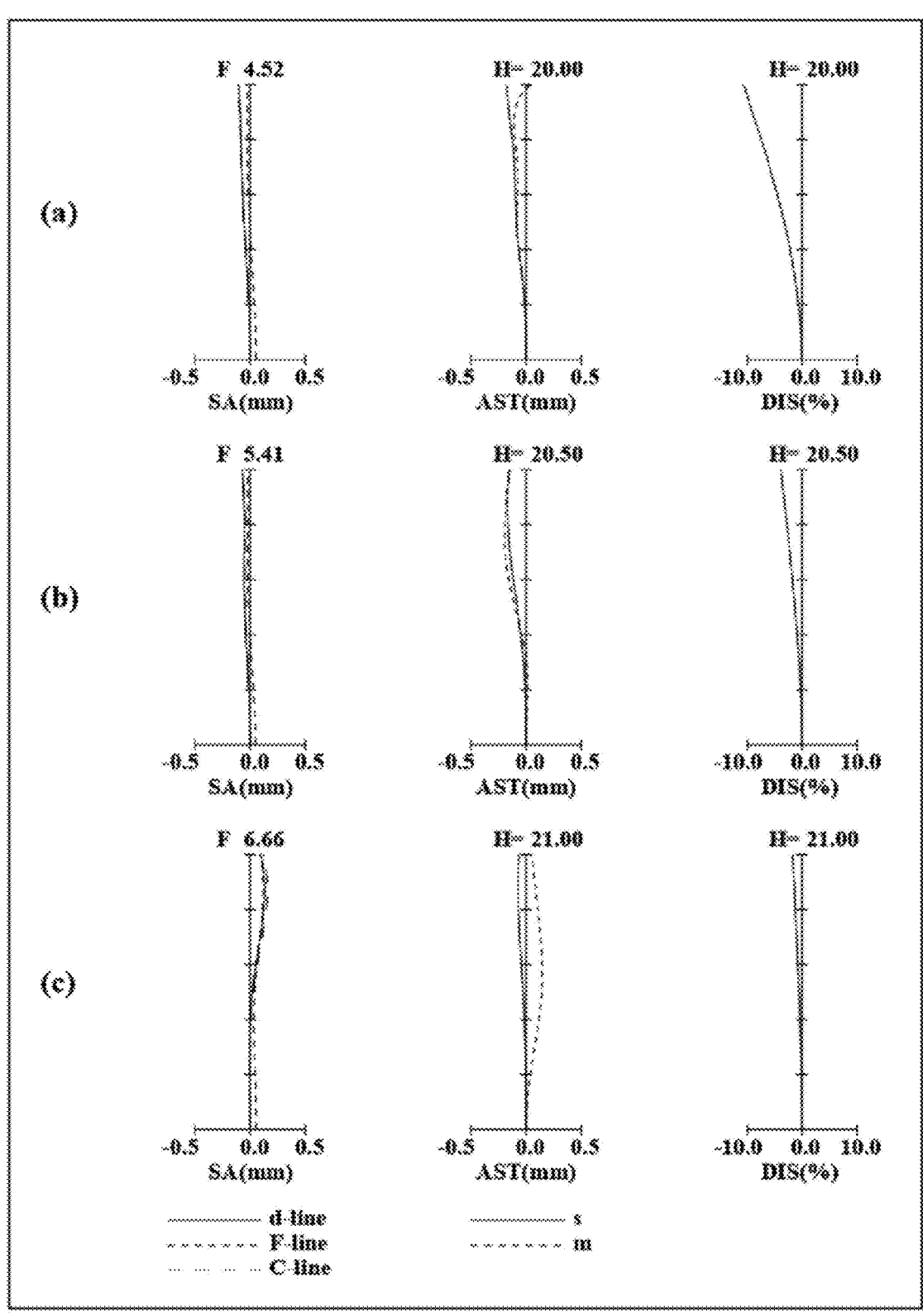
FIG. 6 illustrates longitudinal aberration diagrams showing the infinity in-focus state of the zoom lens system in the third example of numerical values.

FIG. 5 illustrates a zoom lens system according to a third embodiment.

The zoom lens system includes multiple lens groups that consist of: a first lens group G1 having negative power; a second lens group G2 having positive power; a third lens group G3 having negative power; and a fourth lens group G4 having negative power. The first, second, third, and fourth lens groups G1, G2, G3, G4 are arranged in this order such that the first lens group G1 is located closer to an object than any of the second, third, or fourth lens group G2, G3, G4 is, and that the fourth lens group G4 is located closer to an image plane than any of the first, second, or third lens group G1, G2, G3 is.

The zoom lens system forms an image at a point on the image plane S.

The first lens group G1 is made up of: a first lens L1 having negative power; a second lens L2 having negative power; a third lens L3 having negative power; and a fourth lens L4 having positive power. The first lens L1, the second lens L2, the third lens L3, and the fourth lens L4 are arranged in this order such that the first lens L1 is located closer to the object than any other member of this first lens group G1 is and that the fourth lens L4 is located closer to the image plane than any other member of this first lens group G1 is. In this case, the first lens L1 is an example of the negative lens G1L1, the second lens L2 is an example of the negative lens GIL2, and the third lens L3 is an example of the negative lens GIL3.

An aperture stop A is disposed between the first lens group G1 and the second lens group G2.

The second lens group G2 is made up of: a fifth lens L5 having negative power; a sixth lens L6 having positive power; a seventh lens L7 having negative power; an eighth lens L8 having positive power; a ninth lens L9 having positive power; and a tenth lens L10 having positive power. The fifth, sixth, seventh, eighth, ninth, and tenth lenses L5, L6, L7, L8, L9, L10 are arranged in this order such that the fifth lens L5 is located closer to the object than any other member of this second lens group G2 is and that the tenth lens L10 is located closer to the image plane than any other member of this second lens group G2 is. The fifth lens L5 and the sixth lens L6 are bonded together with an adhesive, for example, to form a bonded lens. That is to say, the bonded lens includes the fifth lens L5 and the sixth lens L6. The seventh lens L7 and the eighth lens L8 are bonded together with an adhesive, for example, to form a bonded lens. That is to say, the bonded lens includes the seventh lens L7 and the eighth lens L8.

The third lens group G3 is made up of an eleventh lens L11 having positive power and a twelfth lens L12 having negative power. The eleventh lens L11 and the twelfth lens L12 are arranged in this order such that the eleventh lens L11 is located closer to the object than the twelfth lens L12 is and that the twelfth lens L12 is located closer to the image plane than the eleventh lens L11 is. The eleventh lens L11 and the twelfth lens L12 are bonded together with an adhesive, for example, to form a bonded lens. That is to say, the bonded lens includes the eleventh lens L11 and the twelfth lens L12. In this case, the eleventh lens L11 is an example of the positive lens LG3p.

The fourth lens group G4 is made up of a thirteenth lens L13 having positive power and a fourteenth lens L14 having negative power. The thirteenth lens L13 and the fourteenth lens L14 are arranged in this order such that the thirteenth lens L13 is located closer to the object than the fourteenth lens L14 is and that the fourteenth lens L14 is located closer to the image plane than the thirteenth lens L13 is. The thirteenth lens L13 and the fourteenth lens L14 are bonded together with an adhesive, for example, to form a bonded lens. That is to say, the bonded lens includes the thirteenth lens L13 and the fourteenth lens L14. In this case, the thirteenth lens L13 is an example of the positive lens LG4p.

The respective lenses will be described.

First, the respective lenses that form the first lens group G1 will be described. The first lens L1 is a meniscus lens having a convex surface facing the object. The second lens L2 is a meniscus lens having a convex surface facing the object. The third lens L3 is a biconcave lens. The fourth lens L4 is a biconvex lens. Both surfaces of the second lens L2 have an aspheric shape.

Next, the respective lenses that form the second lens group G2 will be described. The fifth lens L5 is a meniscus lens having a convex surface facing the object. The sixth lens L6 is a biconvex lens. The seventh lens L7 is a biconcave lens. The eighth lens L8 is a biconvex lens. The ninth lens L9 is a biconvex lens. The tenth lens L10 is a biconvex lens. Both surfaces of the ninth lens L9 have an aspheric shape.

Next, the respective lenses that form the third lens group G3 will be described. The eleventh lens L11 is a biconvex lens. The twelfth lens L12 is a biconcave lens.

Next, the respective lenses that form the fourth lens group G4 will be described. The thirteenth lens L13 is a meniscus lens having a convex surface facing the image plane. The fourteenth lens L14 is a meniscus lens having a convex surface facing the image plane.

While the zoom lens system according to the third embodiment is zooming from the wide-angle end toward the telephoto end during a shooting session, the first lens group G1 moves to draw a locus that is convex toward the image plane S and the second lens group G2, the third lens group G3, and the fourth lens group G4 move toward the object with respect to the image plane S. In addition, as the zoom lens system is zooming, the first, second, third, and fourth lens groups G1, G2, G3, G4 move along the optical axis such that the interval between the first lens group G1 and the second lens group G2 decreases, the interval between the second lens group G2 and the third lens group G3 decreases, the interval between the third lens group G3 and the fourth lens group G4 increases, and the interval between the fourth lens group G4 and the image plane S increases.

While the zoom lens system according to the third embodiment is focusing to make a transition from the infinity in-focus state toward the close-object in-focus state, the third lens group G3 moves along the optical axis toward the image plane S.

Fourth Embodiment

Figure 7:
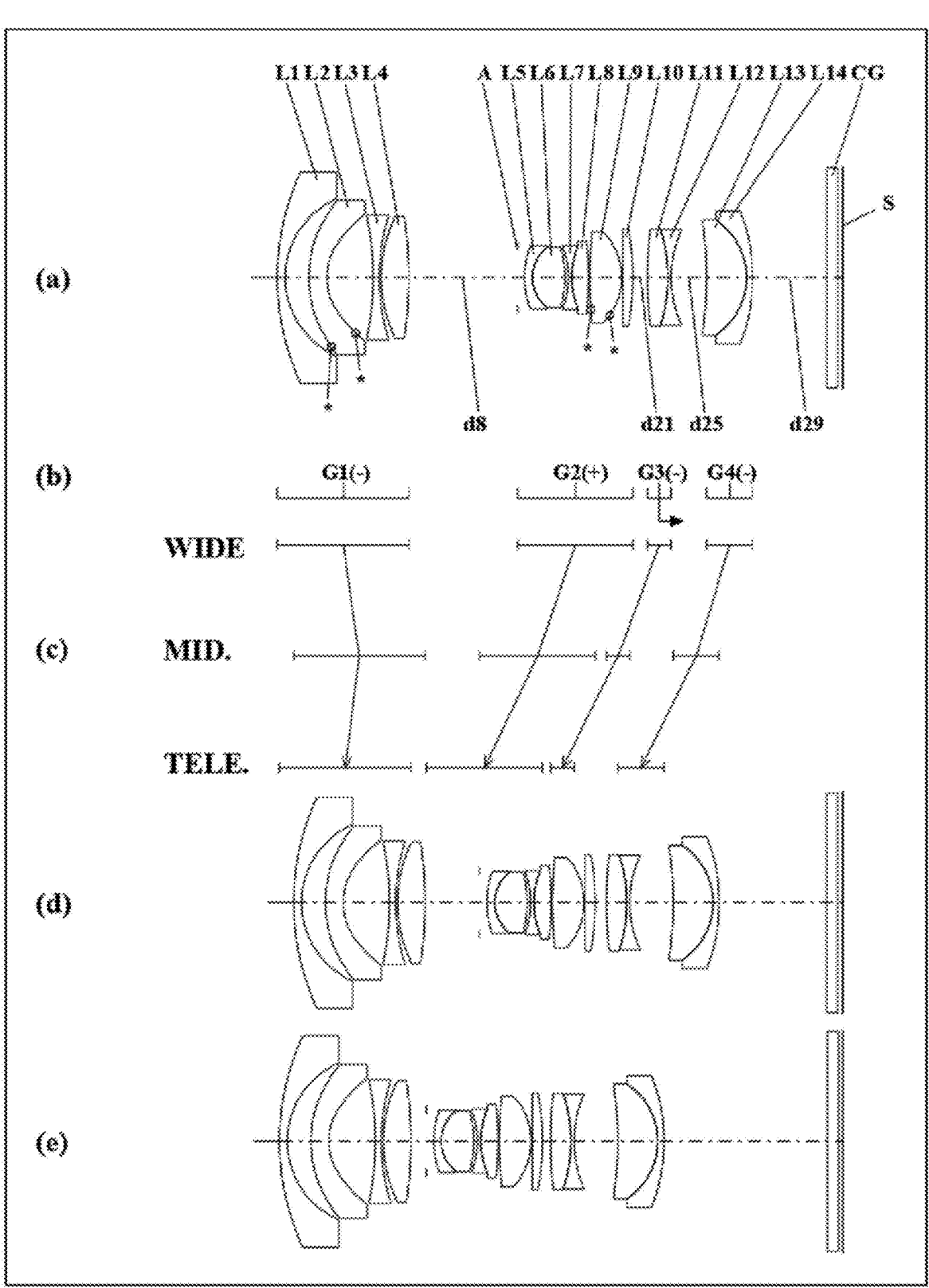
FIG. 7 illustrates lens arrangements showing an infinity in-focus state of a zoom lens system according to a fourth embodiment (corresponding to a fourth example of numerical values)
Figure 8:
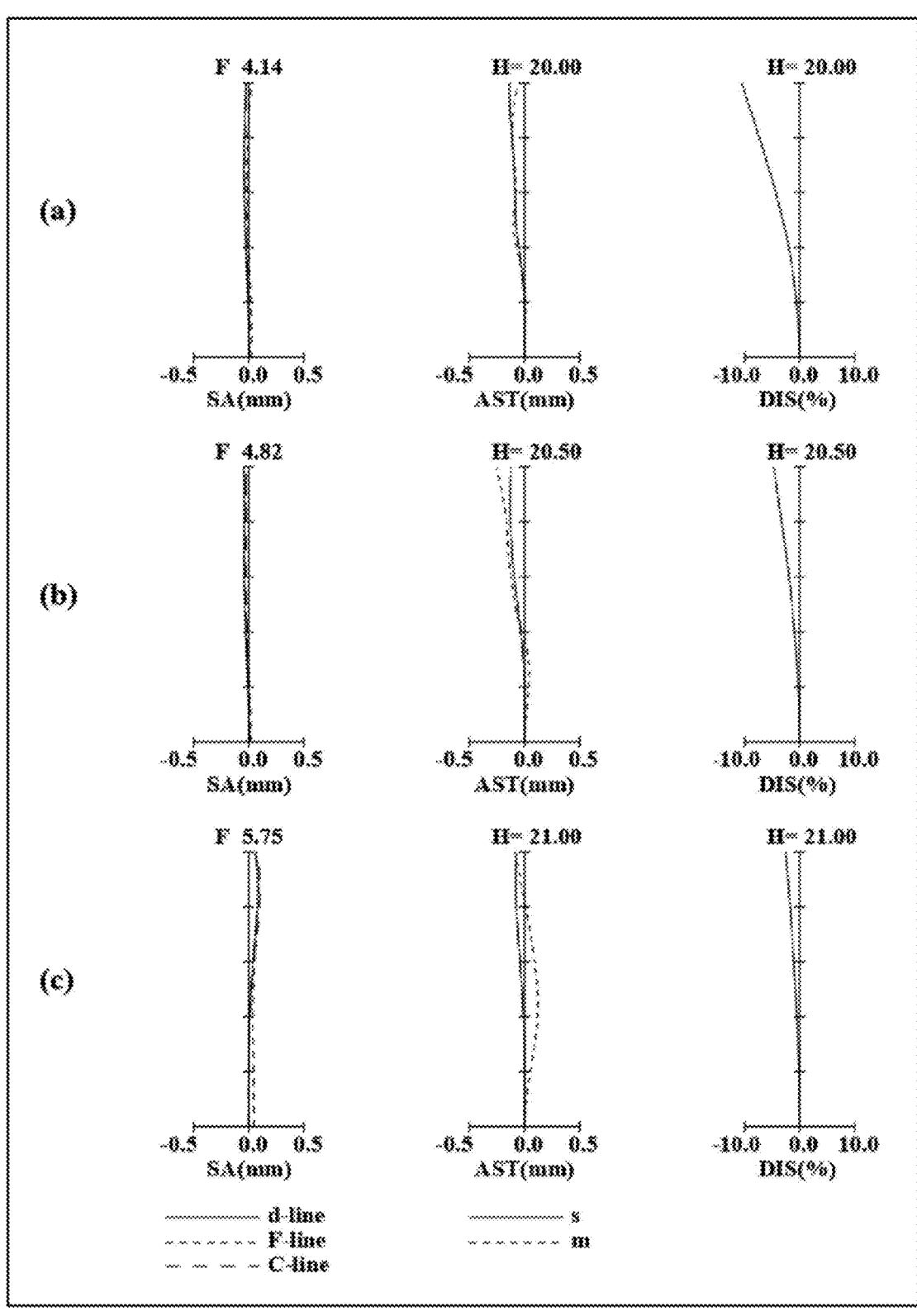
FIG. 8 illustrates longitudinal aberration diagrams showing the infinity in-focus state of the zoom lens system in the fourth example of numerical values.

FIG. 7 illustrates a zoom lens system according to a fourth embodiment.

The zoom lens system includes multiple lens groups that consist of: a first lens group G1 having negative power; a second lens group G2 having positive power; a third lens group G3 having negative power; and a fourth lens group G4 having negative power. The first, second, third, and fourth lens groups G1, G2, G3, G4 are arranged in this order such that the first lens group G1 is located closer to an object than any of the second, third, or fourth lens group G2, G3, G4 is, and that the fourth lens group G4 is located closer to an image plane than any of the first, second, or third lens group G1, G2, G3 is.

The zoom lens system forms an image at a point on the image plane S.

The first lens group G1 is made up of: a first lens L1 having negative power; a second lens L2 having negative power; a third lens L3 having negative power; and a fourth lens L4 having positive power. The first lens L1, the second lens L2, the third lens L3, and the fourth lens L4 are arranged in this order such that the first lens L1 is located closer to the object than any other member of this first lens group G1 is and that the fourth lens L4 is located closer to the image plane than any other member of this first lens group G1 is. In this case, the first lens L1 is an example of the negative lens G1L1, the second lens L2 is an example of the negative lens GIL2, and the third lens L3 is an example of the negative lens GIL3.

An aperture stop A is disposed between the first lens group G1 and the second lens group G2.

The second lens group G2 is made up of: a fifth lens L5 having negative power; a sixth lens L6 having positive power; a seventh lens L7 having negative power; an eighth lens L8 having positive power; a ninth lens L9 having positive power; and a tenth lens L10 having positive power. The fifth, sixth, seventh, eighth, ninth, and tenth lenses L5, L6, L7, L8, L9, L10 are arranged in this order such that the fifth lens L5 is located closer to the object than any other member of this second lens group G2 is and that the tenth lens L10 is located closer to the image plane than any other member of this second lens group G2 is. The fifth lens L5 and the sixth lens L6 are bonded together with an adhesive, for example, to form a bonded lens. That is to say, the bonded lens includes the fifth lens L5 and the sixth lens L6. The seventh lens L7 and the eighth lens L8 are bonded together with an adhesive, for example, to form a bonded lens. That is to say, the bonded lens includes the seventh lens L7 and the eighth lens L8.

The third lens group G3 is made up of an eleventh lens L11 having positive power and a twelfth lens L12 having negative power. The eleventh lens L11 and the twelfth lens L12 are arranged in this order such that the eleventh lens L11 is located closer to the object than the twelfth lens L12 is and that the twelfth lens L12 is located closer to the image plane than the eleventh lens L11 is. The eleventh lens L11 and the twelfth lens L12 are bonded together with an adhesive, for example, to form a bonded lens. That is to say, the bonded lens includes the eleventh lens L11 and the twelfth lens L12. In this case, the eleventh lens L11 is an example of the positive lens LG3p.

The fourth lens group G4 is made up of a thirteenth lens L13 having positive power and a fourteenth lens L14 having negative power. The thirteenth lens L13 and the fourteenth lens L14 are arranged in this order such that the thirteenth lens L13 is located closer to the object than the fourteenth lens L14 is and that the fourteenth lens L14 is located closer to the image plane than the thirteenth lens L13 is. The thirteenth lens L13 and the fourteenth lens L14 are bonded together with an adhesive, for example, to form a bonded lens. That is to say, the bonded lens includes the thirteenth lens L13 and the fourteenth lens L14. In this case, the thirteenth lens L13 is an example of the positive lens LG4p.

The respective lenses will be described.

First, the respective lenses that form the first lens group G1 will be described. The first lens L1 is a meniscus lens having a convex surface facing the object. The second lens L2 is a meniscus lens having a convex surface facing the object. The third lens L3 is a biconcave lens. The fourth lens L4 is a biconvex lens. Both surfaces of the second lens L2 have an aspheric shape.

Next, the respective lenses that form the second lens group G2 will be described. The fifth lens L5 is a meniscus lens having a convex surface facing the object. The sixth lens L6 is a biconvex lens. The seventh lens L7 is a biconcave lens. The eighth lens L8 is a biconvex lens. The ninth lens L9 is a biconvex lens. The tenth lens L10 is a biconvex lens. Both surfaces of the ninth lens L9 have an aspheric shape.

Next, the respective lenses that form the third lens group G3 will be described. The eleventh lens L11 is a biconvex lens. The twelfth lens L12 is a biconcave lens.

Next, the respective lenses that form the fourth lens group G4 will be described. The thirteenth lens L13 is a meniscus lens having a convex surface facing the image plane. The fourteenth lens L14 is a meniscus lens having a convex surface facing the image plane.

While the zoom lens system according to the fourth embodiment is zooming from the wide-angle end toward the telephoto end during a shooting session, the first lens group G1 moves to draw a locus that is convex toward the image plane S and the second lens group G2, the third lens group G3, and the fourth lens group G4 move toward the object with respect to the image plane S. In addition, as the zoom lens system is zooming, the first, second, third, and fourth lens groups G1, G2, G3, G4 move along the optical axis such that the interval between the first lens group G1 and the second lens group G2 decreases, the interval between the second lens group G2 and the third lens group G3 decreases, the interval between the third lens group G3 and the fourth lens group G4 increases, and the interval between the fourth lens group G4 and the image plane S increases.

While the zoom lens system according to the fourth embodiment is focusing to make a transition from the infinity in-focus state toward the close-object in-focus state, the third lens group G3 moves along the optical axis toward the image plane S.

Fifth Embodiment

Figure 9:
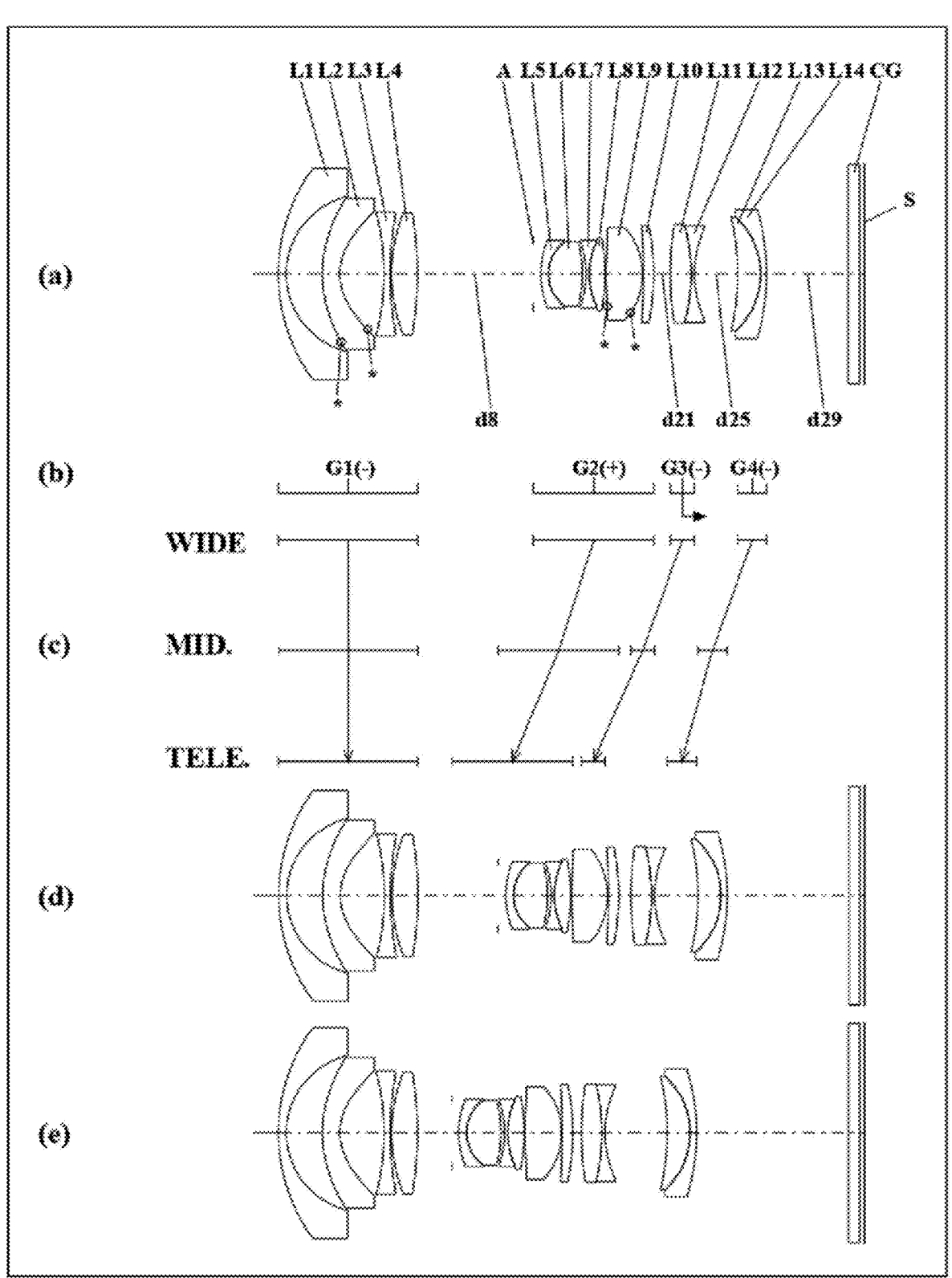
FIG. 9 illustrates lens arrangements showing an infinity in-focus state of a zoom lens system according to a fifth embodiment (corresponding to a fifth example of numerical values)
Figure 10:
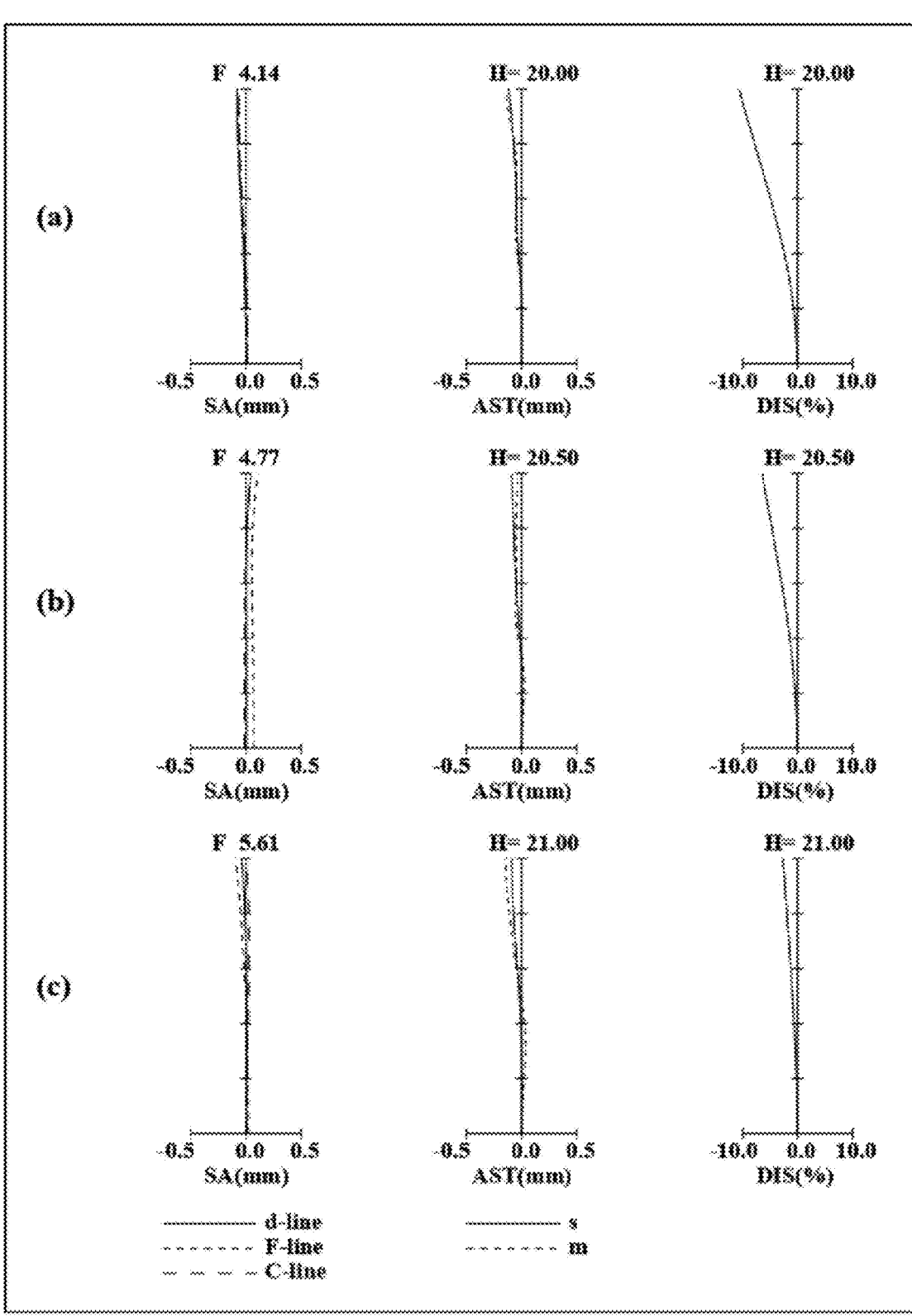
FIG. 10 illustrates longitudinal aberration diagrams showing the infinity in-focus state of the zoom lens system in the fifth example of numerical values.

FIG. 9 illustrates a zoom lens system according to a fifth embodiment.

The zoom lens system includes multiple lens groups that consist of: a first lens group G1 having negative power; a second lens group G2 having positive power; a third lens group G3 having negative power; and a fourth lens group G4 having negative power. The first, second, third, and fourth lens groups G1, G2, G3, G4 are arranged in this order such that the first lens group G1 is located closer to an object than any of the second, third, or fourth lens group G2, G3, G4 is and that the fourth lens group G4 is located closer to an image plane than any of the first, second, or third lens group G1, G2, G3 is.

The zoom lens system forms an image at a point on the image plane S.

The first lens group G1 is made up of: a first lens L1 having negative power; a second lens L2 having negative power; a third lens L3 having negative power; and a fourth lens L4 having positive power. The first lens L1, the second lens L2, the third lens L3, and the fourth lens L4 are arranged in this order such that the first lens L1 is located closer to the object than any other member of this first lens group G1 is and that the fourth lens L4 is located closer to the image plane than any other member of this first lens group G1 is. In this case, the first lens L1 is an example of the negative lens G1L1, the second lens L2 is an example of the negative lens GIL2, and the third lens L3 is an example of the negative lens GIL3.

An aperture stop A is disposed between the first lens group G1 and the second lens group G2.

The second lens group G2 is made up of: a fifth lens L5 having negative power; a sixth lens L6 having positive power; a seventh lens L7 having negative power; an eighth lens L8 having positive power; a ninth lens L9 having positive power; and a tenth lens L10 having positive power. The fifth, sixth, seventh, eighth, ninth, and tenth lenses L5, L6, L7, L8, L9, L10 are arranged in this order such that the fifth lens L5 is located closer to the object than any other member of this second lens group G2 is and that the tenth lens L10 is located closer to the image plane than any other member of this second lens group G2 is. The fifth lens L5 and the sixth lens L6 are bonded together with an adhesive, for example, to form a bonded lens. That is to say, the bonded lens includes the fifth lens L5 and the sixth lens L6. The seventh lens L7 and the eighth lens L8 are bonded together with an adhesive, for example, to form a bonded lens. That is to say, the bonded lens includes the seventh lens L7 and the eighth lens L8.

The third lens group G3 is made up of an eleventh lens L11 having positive power and a twelfth lens L12 having negative power. The eleventh lens L11 and the twelfth lens L12 are arranged in this order such that the eleventh lens L11 is located closer to the object than the twelfth lens L12 is, and that the twelfth lens L12 is located closer to the image plane than the eleventh lens L11 is. The eleventh lens L11 and the twelfth lens L12 are bonded together with an adhesive, for example, to form a bonded lens. That is to say, the bonded lens includes the eleventh lens L11 and the twelfth lens L12. In this case, the eleventh lens L11 is an example of the positive lens LG3*p*.

The fourth lens group G4 is made up of a thirteenth lens L13 having positive power and a fourteenth lens L14 having negative power. The thirteenth lens L13 and the fourteenth lens L14 are arranged in this order such that the thirteenth lens L13 is located closer to the object than the fourteenth lens L14 is and that the fourteenth lens L14 is located closer to the image plane than the thirteenth lens L13 is. The thirteenth lens L13 and the fourteenth lens L14 are bonded together with an adhesive, for example, to form a bonded lens. That is to say, the bonded lens includes the thirteenth lens L13 and the fourteenth lens L14. In this case, the thirteenth lens L13 is an example of the positive lens LG4*p*.

The respective lenses will be described.

First, the respective lenses that form the first lens group G1 will be described. The first lens L1 is a meniscus lens having a convex surface facing the object. The second lens L2 is a meniscus lens having a convex surface facing the object. The third lens L3 is a biconcave lens. The fourth lens L4 is a biconvex lens. Both surfaces of the second lens L2 have an aspheric shape.

Next, the respective lenses that form the second lens group G2 will be described. The fifth lens L5 is a meniscus lens having a convex surface facing the object. The sixth lens L6 is a biconvex lens. The seventh lens L7 is a biconcave lens. The eighth lens L8 is a biconvex lens. The ninth lens L9 is a biconvex lens. The tenth lens L10 is a meniscus lens having a convex surface facing the image plane. Both surfaces of the ninth lens L9 have an aspheric shape.

Next, the respective lenses that form the third lens group G3 will be described. The eleventh lens L11 is a biconvex lens. The twelfth lens L12 is a biconcave lens.

Next, the respective lenses that form the fourth lens group G4 will be described. The thirteenth lens L13 is a meniscus lens having a convex surface facing the image plane. The fourteenth lens L14 is a meniscus lens having a convex surface facing the image plane.

While the zoom lens system according to the fifth embodiment is zooming from the wide-angle end toward the telephoto end during a shooting session, the first lens group G1 moves to draw a locus that is convex toward the image plane S and the second lens group G2, the third lens group G3, and the fourth lens group G4 move toward the object with respect to the image plane S. In addition, as the zoom lens system is zooming, the first, second, third, and fourth lens groups G1, G2, G3, G4 move along the optical axis such that the interval between the first lens group G1 and the second lens group G2 decreases, the interval between the second lens group G2 and the third lens group G3 decreases, the interval between the third lens group G3 and the fourth lens group G4 decreases from the wide-angle end through the middle position and increases from the middle position through the telephoto end, and the interval between the fourth lens group G4 and the image plane S increases.

While the zoom lens system according to the fifth embodiment is focusing to make a transition from the infinity in-focus state toward the close-object in-focus state, the third lens group G3 moves along the optical axis toward the image plane S.

Other Embodiments

The first, second, third, fourth, and fifth embodiments have been described as exemplary embodiments of the present disclosure. Note that the embodiments described above are only examples of the present disclosure and should not be construed as limiting. Rather, each of these embodiments may be readily modified, replaced, combined with other embodiments, provided with some additional components, or partially omitted without departing from the scope of the present disclosure.

For example, in the first to fifth embodiments described above, the zoom lens system is supposed to be used in the entire zoom range from the wide-angle end through the telephoto end. However, the zoom lens system does not have to be used in the entire zoom range. Alternatively, the zoom lens system may also be used selectively only in an extracted range where optical performance is ensured according to the desired zoom range, for example. That is to say, the zoom lens system may also be used as a zoom lens system with lower zoom power than the zoom lens system to be described for the first, second, third, fourth, and fifth examples of numerical values corresponding to the first, second, third, fourth, and fifth embodiments, respectively. Optionally, the zoom lens system may also be used selectively as a single-focus lens system only at an extracted focal length where optical performance is ensured according to the desired zoom position.

In addition, the number of the lens groups and the number of the lenses that form each lens group are substantial numbers. Optionally, a lens having substantially no power may be added to any of the lens groups described above.

Conditions and Advantages

Next, conditions that may be satisfied by the zoom lens systems according to the first to fifth embodiments, for example, will be described. A plurality of possible conditions may be defined for the zoom lens systems according to each of these five embodiments. In that case, a zoom lens system, of which the configuration satisfies all of these possible conditions, is most advantageous. Alternatively, a zoom lens system that achieves its expected advantages by satisfying any of the individual conditions to be described below may also be provided.

A zoom lens system according to each of the first to fifth embodiments described above includes multiple lens groups and an aperture stop. The multiple lens groups consist of: a first lens group G1 having negative power; a second lens group G2 having positive power; a third lens group G3 having negative power; and a fourth lens group G4 having negative power. The first, second, third, and fourth lens groups G1, G2, G3, G4 are arranged in this order such that the first lens group G1 is located closer to an object than any of the second, third, or fourth lens group G2, G3, G4 is, and that the fourth lens group G4 is located closer to an image plane than any of the first, second, or third lens group G1, G2, G3 is. The aperture stop is disposed between the first lens group G1 and the second lens group G2. An interval between each pair of lens groups that are adjacent to each other among the multiple lens groups G1-G4 changes as the first, second, third, and fourth lens groups G1, G2, G3, G4 move along an optical axis of the zoom lens system while the zoom lens system is zooming. The third lens group G3 moves along the optical axis while the zoom lens system is focusing to make a transition from an infinity in-focus state toward a close-object in-focus state.

This configuration may reduce not only the overall size of the zoom lens system but also a variation in aberration during focusing as well.

The zoom lens system preferably satisfies the following inequality (1):

$$0.5 < fw/BFw < 1.5 \tag{1}$$

where fw is a focal length of the zoom lens system at a wide-angle end and BFw is a back focus of the zoom lens system at the wide-angle end.

The condition expressed by the inequality (1) defines the ratio of the focal length at the wide-angle end to the back focus at the wide-angle end (i.e., an air conversion length from an image-side surface of a lens, located closest to the image plane, to the image plane). Satisfying this condition expressed by the inequality (1) enables compensating for various types of aberrations sufficiently over the entire zoom range.

Conversely, if fw/BFw were equal to or less than the lower limit set by the inequality (1), then it would make the back focus too long to reduce the overall size of the zoom lens system easily, which is not beneficial. On the other hand, if fw/BFw were equal to or greater than the upper limit set by the inequality (1), then it would make the back focus too short to compensate for various types of aberrations sufficiently.

To enhance the advantage described above, the condition(s) expressed by one or both of the following inequalities (1a) and (1b) is/are preferably satisfied:

$$0.6 < fw/BFw \tag{1a}$$

$$fw/BFw < 1.3. \tag{1b}$$

More preferably, to further enhance the advantage described above, the condition(s) expressed by one or both of the following inequalities (1c) and (1d) is/are satisfied:

$$0.7 < fw/BFw \tag{1c}$$

$$fw/BFw < 1.1. \tag{1d}$$

Also, in the zoom lens system having the above-described configuration, the aperture stop A preferably moves along the optical axis together with the second lens group G2 while the zoom lens system is zooming, for example.

This eliminates the need to provide a mechanism for moving the aperture stop A along the optical axis, thus providing a zoom lens system of a smaller size.

Furthermore, the first lens group G1 preferably moves to draw a locus that is convex toward the image plane, for example, while the zoom lens system having the above-described configuration is zooming.

This configuration may reduce the difference in total optical length between the wide-angle end and the telephoto end, thus providing a zoom lens system, of which the center of gravity moves less significantly during zooming.

Furthermore, in the zoom lens system having the above-described configuration, the first lens group G1 preferably includes a plurality of lenses. The plurality of lenses preferably includes a negative lens G1L1, a negative lens G1L2, and a negative lens G1L3. The negative lens G1L1 is located closest to the object among the plurality of lenses of the first lens group G1. The negative lens G1L2 is located second closest to the object among the plurality of lenses of the first lens group G1. The negative lens G1L3 is located third closest to the object among the plurality of lenses of the first lens group G1. The zoom lens system preferably satisfies the following inequality (2):

$$65 < vd1 < 100 \tag{2}$$

where vd1 is an abbe number of at least one negative lens, selected from the group consisting of the negative lenses G1L1, G1L2, and G1L3, in response to a d-line.

The condition expressed by this inequality (2) defines the abbe number of at least one negative lens, selected from the group consisting of the negative lenses G1L1, G1L2, and G1L3, in response to a d-line. If vd1 were equal to or less than the lower limit set by this inequality (2), then a high dispersion material would have to be selected, thus making it difficult to compensate for various types of aberrations (such as a chromatic aberration, among other things). On the other hand, if vd1 were equal to or greater than the upper limit set by this inequality (2), then a low refractive index material would have to be selected, thus making it difficult to compensate for various types of aberrations (such as a spherical aberration, among other things).

To enhance the advantage described above, the negative lenses G1L2 and G1L3 preferably both satisfy the condition expressed by this inequality (2).

More preferably, to further enhance the advantage described above, the condition(s) expressed by one or both of the following inequalities (2a) and (2b) is/are preferably satisfied:

$$70 < vd1 \tag{2a}$$

$$vd1 < 90. \tag{2b}$$

Even more preferably, to further enhance the advantage described above, the condition(s) expressed by one or both of the following inequalities (2c) and (2d) is/are preferably satisfied:

$$80 < vd1 \tag{2c}$$

$$vd1 < 85. \tag{2d}$$

Furthermore, the zoom lens system having the above-described configuration preferably satisfies the following inequality (3):

$$0.1 < DL1/DL2 < 0.9 \tag{3}$$

where DL1 is a thickness of the negative lens G1L1 as measured along the optical axis; and DL2 is a thickness of the negative lens G1L2 as measured along the optical axis.

The condition expressed by this inequality (3) defines the ratio of the thickness of the negative lens G1L1 as measured along the optical axis to the thickness of the negative lens G1L2 as measured along the optical axis. If DL1/DL2 were equal to or less than the lower limit set by this inequality (3), then the negative lens G1L2 would be so thick as to make the outside diameter of the lens too large, which would make it difficult to reduce the overall size of the zoom lens system. Conversely, if DL1/DL2 were equal to or greater than the upper limit set by this inequality (3), then the negative lens G1L2 would be too thin to manufacture the zoom lens system easily.

To enhance the advantage described above, the condition(s) expressed by one or both of the following inequalities (3a) and (3b) is/are preferably satisfied:

$$0.2 < DL1/DL2 \tag{3a}$$

$$DL1/DL2 < 0.7. \tag{3b}$$

More preferably, to further enhance the advantage described above, the condition(s) expressed by one or both of the following inequalities (3c) and (3d) is/are satisfied:

$$0.3 < DL1/DL2 \tag{3c}$$

$$DL1/DL2 < 0.5. \tag{3d}$$

Furthermore, the zoom lens system having the above-described configuration preferably satisfies the following inequality (4):

$$0.5 < |fG3/fG2| < 2.5 \tag{4}$$

where fG2 is a focal length of the second lens group G2, and fG3 is a focal length of the third lens group G3.

The condition expressed by this inequality (4) defines the ratio of the focal length of the third lens group G3 to the focal length of the second lens group G2. Satisfying the condition defined by this inequality (4) enables reducing the size of the zoom lens system while ensuring sufficient focus accuracy.

Conversely, if |fG3/fG2| were equal to or less than the lower limit set by this inequality (4), then the focus lens group would have too high position sensitivity to control the focus lens group easily. On the other hand, if |fG3/fG2| were equal to or greater than the upper limit set by this inequality (4), then the focus lens group would have its magnitude of movement increased so much as to cause a significant increase in the overall size of the lens system, which is unbeneficial.

To enhance the advantage described above, the condition(s) expressed by one or both of the following inequalities (4a) and (4b) is/are preferably satisfied:

$$1.0 < |fG3/fG2| \tag{4a}$$

-continued $$|fG3/fG2| < 2.2. \tag{4b}$$

More preferably, to further enhance the advantage described above, the condition(s) expressed by one or both of the following inequalities (4c) and (4d) is/are satisfied:

$$1.4 < |fG3/fG2| \tag{4c}$$

$$|fG3/fG2| < 2.0. \tag{4d}$$

Furthermore, in the zoom lens system having the above-described configuration, the third lens group G3 preferably includes at least one positive lens LG3p that satisfies the following inequality (5):

$$14 < vG3p < 35 \tag{5}$$

where vG3p is an abbe number of the at least one positive lens LG3p in response to a d-line.

The condition expressed by this inequality (5) defines the abbe number of the positive lens LG3p in response to a d-line. Satisfying the condition expressed by this inequality (5) enables compensating for various types of aberrations effectively (such as chromatic aberration of magnification, among other things).

Conversely, if vG3p were equal to or less than the lower limit set by this inequality (5), then the absolute value of the Petzval sum would be too large to compensate for the field curvature easily. On the other hand, if vG3p were equal to or greater than the upper limit set by this inequality (5), a high dispersion material would have to be selected to make it difficult to compensate for various types of aberrations (such as chromatic aberration, among other things).

To enhance the advantage described above, the condition(s) expressed by one or both of the following inequalities (5a) and (5b) is/are preferably satisfied:

$$16 < vG3p \tag{5a}$$

$$vG3p < 25. \tag{5b}$$

More preferably, to further enhance the advantage described above, the condition(s) expressed by one or both of the following inequalities (5c) and (5d) is/are satisfied:

$$17 < vG3p \tag{5c}$$

$$vG3p < 20. \tag{5d}$$

Furthermore, in the zoom lens system having the above-described configuration, the fourth lens group G4 preferably includes at least one positive lens LG4p that satisfies the following inequality (6):

$$65 < vG4p < 100 \tag{6}$$

where vG4$p$ is an abbe number of the at least one positive lens LG4$p$ in response to a d-line.

The condition expressed by this inequality (6) defines the abbe number of the positive lens LG4$p$ belonging to the fourth lens group G4 in response to a d-line. Satisfying the condition expressed by this inequality (6) enables compensating for various types of aberrations (such as axial chromatic aberration and chromatic aberration of magnification, among other things).

Conversely, if vG4$p$ were equal to or less than the lower limit set by this inequality (6), then a high dispersion material would have to be selected to make it difficult to compensate for the chromatic aberration. On the other hand, if vG4$p$ were equal to or greater than the upper limit set by this inequality (6), then a low refractive index material would have to be selected to make it difficult to compensate for various types of aberrations (such as the field curvature, among other things).

To enhance the advantage described above, the condition(s) expressed by one or both of the following inequalities (6a) and (6b) is/are preferably satisfied:

$$70 < vG4p \qquad (6a)$$

$$vG4p < 90. \qquad (6b)$$

More preferably, to further enhance the advantage described above, the condition(s) expressed by one or both of the following inequalities (6c) and (6d) is/are satisfied:

$$80 < vG4p \qquad (6c)$$

$$vG4p < 85. \qquad (6d)$$

Figure 11:
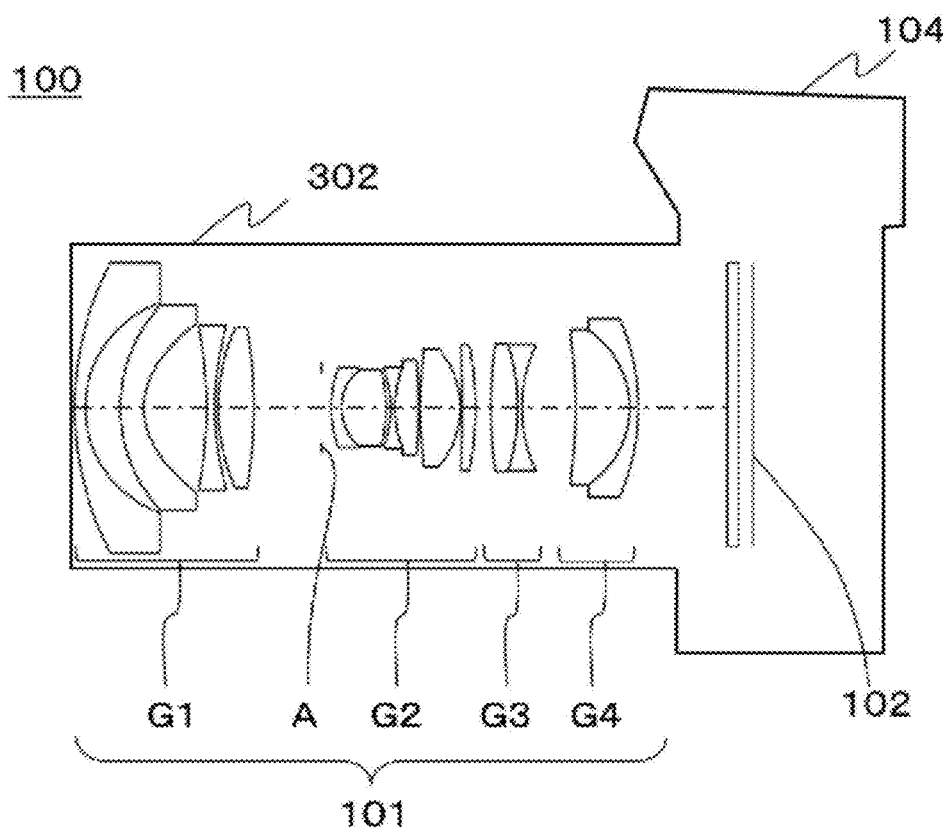
FIG. 11 illustrates a schematic configuration for an image capture device according to the first embodiment.

Schematic Configuration for Image Capture Device to which First Embodiment is Applied FIG. 11 illustrates a schematic configuration for an image capture device, to which the zoom lens system of the first embodiment is applied. Alternatively, the zoom lens system according to the second, third, fourth, or fifth embodiment is also applicable to the image capture device.

The image capture device 100 includes a housing 104, an image sensor 102, and the zoom lens system 101 according to the first embodiment. Specifically, the image capture device 100 may be implemented as a digital camera, for example.

The housing 104 includes a lens barrel 302. The lens barrel 302 holds the respective lens groups and the aperture stop A that form the zoom lens system 101.

The image sensor 102 is disposed at the image plane S of the zoom lens system according to the first embodiment.

In the zoom lens system 101, the first lens group G1, the third lens group G3, and the fourth lens group G4 are attached to, or engaged with, a lens frame included in the lens barrel 302 so as to move while the zoom lens system 101 is zooming.

This provides an image capture device with the ability to compensate for various types of aberrations sufficiently.

In the example described above, the zoom lens system according to the first embodiment is applied to a digital camera. However, this is only an example and should not be construed as limiting. Alternatively, the zoom lens system is also applicable to a surveillance camera, a smartphone, or any of various other types of image capture devices.

Schematic Configuration for Camera System to which First Embodiment is Applied

Figure 12:
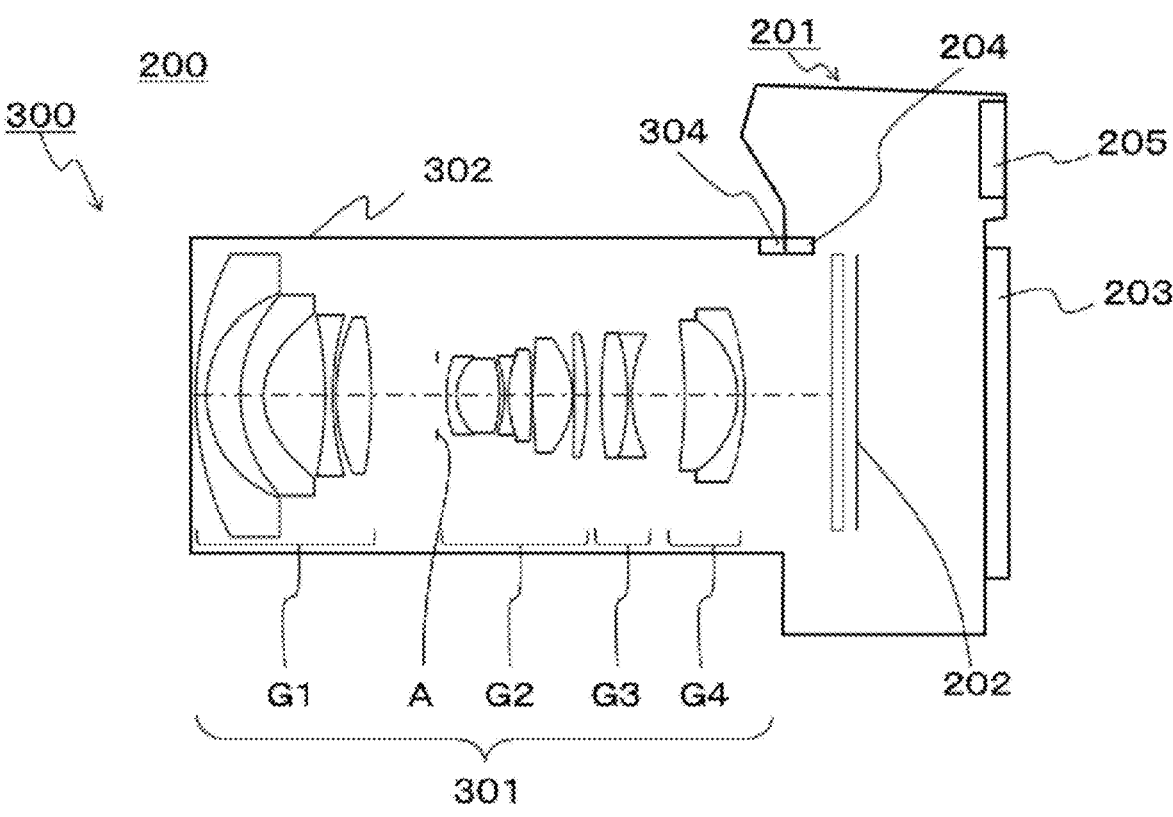
FIG. 12 illustrates a schematic configuration for a camera system according to the first embodiment.

FIG. 12 illustrates a schematic configuration for a camera system, to which the zoom lens system of the first embodiment is applied. Alternatively, the zoom lens system according to the second, third, fourth, or fifth embodiment is also applicable to the camera system.

The camera system 200 includes a camera body 201 and an interchangeable lens unit 300 to be connected removably to the camera body 201.

The camera body 201 includes an image sensor 202, a monitor 203, a memory, a camera mount 204, and a viewfinder 205. The image sensor 202 receives an optical image formed by the zoom lens system 301 of the interchangeable lens unit 300 and transforms the optical image into an electrical image signal. The monitor 203 displays the image signal transformed by the image sensor 202. The memory stores the image signal.

The zoom lens system 301 of the interchangeable lens unit 300 is the zoom lens system according to the first embodiment.

The interchangeable lens unit 300 includes not only the zoom lens system 301 but also a lens barrel 302 and a lens mount 304 as well. The lens barrel 302 holds the respective lens groups and aperture stop A that form the zoom lens system 301. The lens mount 304 is to be connected to the camera mount 204 of the camera body 201.

The camera mount 204 and the lens mount 304 are physically connected together. In addition, the camera mount 204 and the lens mount 304 also electrically connect together a controller in the camera body 201 and a controller in the interchangeable lens unit 300. That is to say, the camera mount 204 and the lens mount 304 serve as interfaces that allow themselves to exchange signals with each other.

In the zoom lens system 301, the first lens group G1, the third lens group G3, and the fourth lens group G4 are attached to, or engaged with, a lens frame included in the lens barrel 302 so as to be movable while the zoom lens system 301 is zooming.

The camera system 200 including the respective lens groups held by the lens barrel 302 and the camera body 201 further includes an actuator, a lens frame, and other members to be controlled by the controller in the interchangeable lens unit 300 such that the fourth lens group G4 may move while the zoom lens system 301 is focusing.

Examples of Numerical Values

Next, exemplary sets of specific numerical values that were actually adopted in the zoom lens systems with the configurations according to the first, second, third, fourth, and fifth embodiments will be described. Note that in the tables showing these exemplary sets of numerical values, the length is expressed in millimeters (mm), the angle of view is expressed in degrees (°), r indicates the radius of curvature, d indicates the surface interval, nd indicates a refractive index in response to a d-line, vd (also denoted as "vd") indicates an abbe number in response to a d-line, and a surface with an asterisk (*) is an aspheric surface. The aspheric shape is defined by the following equation.

$$Z = \frac{h^2/r}{1 + \sqrt{1 - (1+\kappa)(h/r)^2}} + \sum A_n h^n$$

where Z is the distance from a point on an aspheric surface, located at a height h measured from the optical axis, to a tangent plane defined with respect to the vertex of the aspheric surface, h is the height as measured from the optical axis, r is the radius of curvature of the vertex, K is a conic constant, and An is an $n^{th}$ order aspheric surface coefficient.

FIGS. 2, 4, 6, 8, and 10 are longitudinal aberration diagrams of the zoom lens systems according to the first, second, third, fourth, and fifth embodiments in the infinity in-focus state.

In each longitudinal aberration diagram, portion (a) shows the longitudinal aberrations at the wide-angle end, portion (b) shows the longitudinal aberrations at the middle position, and portion (c) shows the longitudinal aberrations at the telephoto end. Each of portions (a), (b) and (c) of these longitudinal aberration diagrams shows spherical aberration (SA (mm)), astigmatism (AST (mm)), and distortion (DIS (%)) in this order from left to right. In each spherical aberration diagram, the ordinate indicates the F number (designated by "F" on the drawings), the solid curve indicates a characteristic in response to a d-line, the shorter dashed curve indicates a characteristic in response to an F-line, and the longer dashed curve indicates a characteristic in response to a C-line. In each astigmatism diagram, the ordinate indicates the image height (designated by "H" on the drawings), the solid curve indicates a characteristic with respect to a sagittal plane (designated by "s" on the drawings), and the dotted curve indicates a characteristic with respect to a meridional plane (designated by "m" on the drawings). Furthermore, in each distortion diagram, the ordinate indicates the image height (designated by "H" on the drawings).

First Example of Numerical Values

Following is a first exemplary set of numerical values for the zoom lens system corresponding to the first embodiment shown in FIG. 1. Specifically, as the first example of numerical values for the zoom lens system, surface data is shown in Table 1, aspheric surface data is shown in Table 2, and various types of data in the infinity in-focus state are shown in Tables 3A-3D:

TABLE 1

| | (Surface data) | | | |
|---|---|---|---|---|
| Surface No. | r | d | nd | vd |
| Object surface | ∞ | | | |
| 1 | 45.79630 | 1.50000 | 1.80420 | 46.5 |
| 2 | 16.08700 | 5.10280 | | |
| 3* | 23.23640 | 3.40000 | 1.53380 | 55.6 |
| 4* | 10.76920 | 9.08260 | | |
| 5 | −59.53330 | 1.20000 | 1.59283 | 68.6 |
| 6 | 43.40440 | 0.46460 | | |
| 7 | 28.09870 | 5.19220 | 1.67196 | 31.5 |
| 8 | −70.62550 | Variable | | |
| 9 (aperture) | ∞ | 1.40000 | | |
| 10 | 16.91820 | 1.50000 | 1.77319 | 49.6 |
| 11 | 7.33070 | 0.01000 | 1.56732 | 42.8 |
| 12 | 7.33070 | 6.43800 | 1.70147 | 40.9 |
| 13 | −21.16830 | 0.67510 | | |
| 14 | −16.18120 | 0.60000 | 2.00100 | 29.1 |
| 15 | 15.97100 | 0.01000 | 1.56732 | 42.8 |
| 16 | 15.97100 | 3.43500 | 1.49700 | 81.6 |
| 17 | −77.88860 | 0.20000 | | |
| 18* | 46.08050 | 5.94820 | 1.55332 | 71.7 |
| 19* | −13.02350 | 0.20000 | | |
| 20 | −344.29590 | 1.97000 | 1.81012 | 21.2 |
| 21 | −45.07890 | Variable | | |
| 22 | 69.41410 | 3.86580 | 1.94595 | 18.0 |
| 23 | −31.16060 | 0.01000 | 1.56732 | 42.8 |
| 24 | −31.16060 | 0.60000 | 1.92119 | 24.0 |
| 25 | 21.26120 | Variable | | |
| 26 | −74.08700 | 7.79740 | 1.49700 | 81.6 |
| 27 | −13.43170 | 0.01000 | 1.56732 | 42.8 |
| 28 | −13.43170 | 1.20000 | 1.80309 | 35.2 |
| 29 | −32.98430 | Variable | | |
| 30 | ∞ | 2.10000 | 1.51680 | 64.2 |
| 31 | ∞ | 1.00000 | | |
| 32 | ∞ | BF | | |
| Image plane | ∞ | | | |

TABLE 2

(Aspheric surface data)

$3^{rd}$ surface

K = 9.10375E−01, A4 = 2.25898E−05, A6 = −4.12855E−07, A8 = 3.68903E−09,
A10 = −2.27397E−11, A12 = 7.14463E−14, A14 = −9.62268E−17

$4^{th}$ surface

K = −9.49882E−01, A4 = 6.97194E−05, A6 = −9.89610E−07, A8 = 1.51689E−08,
A10 = −1.43321E−10, A12 = 6.56888E−13, A14 = −1.20294E−15

$18^{th}$ surface

K = 0.00000E+00, A4 = −6.56399E−05, A6 = 2.10293E−08, A8 = 2.51435E−09,
A10 = 2.03077E−11, A12 = 0.00000E+00, A14 = 0.00000E+00

$19^{th}$ surface

K = 0.00000E+00, A4 = 6.18242E−06, A6 = −1.38698E−07, A8 = 9.61955E−11,
A10 = −3.43267E−11, A12 = 4.15133E−13, A14 = 0.00000E+00

(Various types of data in infinity in-focus state)

TABLE 3A

| (Various types of data) Zoom ratio: 1.84963 | | | |
|---|---|---|---|
| | Wide-angle | Middle | Telephoto |
| Focal length | 14.5582 | 19.8039 | 26.9273 |
| F number | 4.13947 | 4.78588 | 5.68020 |
| Angle of view | 56.9492 | 47.4704 | 38.7833 |
| Image height | 20.0000 | 20.5000 | 21.0000 |
| Total lens length | 108.2294 | 104.6376 | 106.8651 |
| BF | 0.02728 | 0.03369 | −0.06036 |
| d8 | 20.3915 | 9.7847 | 2.1029 |
| d21 | 2.8898 | 2.1657 | 1.4543 |
| d25 | 6.6091 | 7.8261 | 8.0849 |
| d29 | 13.4000 | 19.9157 | 30.3717 |
| Entrance pupil position | 16.2858 | 14.7628 | 13.2662 |
| Exit pupil position | −47.3580 | −54.7804 | −65.3530 |
| Anterior principal point | 26.3713 | 27.4117 | 29.0884 |
| Posterior principal point | 93.6712 | 84.8337 | 79.9378 |

TABLE 3B

| (Data about single lenses) | | |
|---|---|---|
| Lens | Start surface | Focal length |
| 1 | 1 | −31.5454 |
| 2 | 3 | −41.5444 |
| 3 | 5 | −42.1611 |
| 4 | 7 | 30.5606 |
| 5 | 10 | −17.9555 |
| 6 | 12 | 8.5595 |
| 7 | 14 | −7.9554 |
| 8 | 16 | 26.9949 |
| 9 | 18 | 19.0330 |
| 10 | 20 | 63.8394 |
| 11 | 22 | 23.1681 |
| 12 | 24 | −13.6444 |
| 13 | 26 | 31.6592 |
| 14 | 28 | −29.0074 |

TABLE 3C

| (Data about zoom lens groups) | | | | | |
|---|---|---|---|---|---|
| Group | Start surface | Focal length | Lens configuration length | Anterior principal point | Posterior principal point |
| 1 | 1 | −24.25686 | 25.94220 | 0.49045 | 1.05292 |
| 2 | 9 | 20.08160 | 22.38630 | 13.64640 | 16.96144 |
| 3 | 22 | −36.29767 | 4.47580 | 3.56976 | 5.62762 |
| 4 | 26 | −217.23217 | 9.00740 | −5.71195 | −2.97958 |

TABLE 3D

| (Zoom powers of zoom lens groups) | | | | |
|---|---|---|---|---|
| Group | Start surface | Wide-angle | Middle | Telephoto |
| 1 | 1 | 0.00000 | 0.00000 | 0.00000 |
| 2 | 9 | −0.31824 | −0.38254 | −0.44811 |

TABLE 3D-continued

| (Zoom powers of zoom lens groups) | | | | |
|---|---|---|---|---|
| Group | Start surface | Wide-angle | Middle | Telephoto |
| 3 | 22 | 1.67195 | 1.84305 | 2.05464 |
| 4 | 26 | 1.12797 | 1.15799 | 1.20569 |

Second Example of Numerical Values

Following is a second exemplary set of numerical values for the zoom lens system corresponding to the second embodiment shown in FIG. 3. Specifically, as the second example of numerical values for the zoom lens system, surface data is shown in Table 4, aspheric surface data is shown in Table 5, and various types of data in the infinity in-focus state are shown in Tables 6A-6D:

TABLE 4

| (Surface data) | | | | |
|---|---|---|---|---|
| Surface No. | r | d | nd | vd |
| Object surface | ∞ | | | |
| 1* | 27.90950 | 2.00000 | 1.84855 | 47.0 |
| 2* | 12.43010 | 8.43870 | | |
| 3* | 21.80870 | 2.50000 | 1.59201 | 67.0 |
| 4* | 11.07580 | 8.66550 | | |
| 5 | −64.72410 | 1.20000 | 1.59283 | 68.6 |
| 6 | 44.51600 | 0.42190 | | |
| 7 | 27.62100 | 4.75670 | 1.66945 | 32.4 |
| 8 | −88.13670 | Variable | | |
| 9 (aperture) | ∞ | 1.40000 | | |
| 10 | 18.00650 | 1.08140 | 1.77250 | 49.6 |
| 11 | 7.14530 | 0.01000 | 1.56732 | 42.8 |
| 12 | 7.14530 | 6.30000 | 1.70154 | 41.1 |
| 13 | −20.54740 | 0.66110 | | |
| 14 | −16.38600 | 0.60000 | 2.00100 | 29.1 |
| 15 | 16.51900 | 0.01000 | 1.56732 | 42.8 |
| 16 | 16.51900 | 3.43230 | 1.49700 | 81.6 |
| 17 | −90.19970 | 0.20000 | | |
| 18* | 40.50830 | 5.41380 | 1.55332 | 71.7 |
| 19* | −13.38690 | 0.20000 | | |
| 20 | 252.58500 | 1.97000 | 1.80827 | 21.6 |
| 21 | −55.66210 | Variable | | |
| 22 | 74.03870 | 3.84230 | 1.94595 | 18.0 |
| 23 | −29.30270 | 0.01000 | 1.56732 | 42.8 |
| 24 | −29.30270 | 0.60000 | 1.92119 | 24.0 |
| 25 | 21.52550 | Variable | | |
| 26 | −65.03000 | 8.15250 | 1.49700 | 81.6 |
| 27 | −13.56310 | 0.20000 | | |
| 28 | −13.60350 | 1.20000 | 1.80255 | 28.2 |
| 29* | −28.58600 | Variable | | |
| 30 | ∞ | 2.10000 | 1.51680 | 64.2 |
| 31 | ∞ | 1.00000 | | |
| 32 | ∞ | BF | | |
| Image plane | ∞ | | | |

TABLE 5

| (Aspheric surface data) |
| --- |

$1^{st}$ surface

K = 0.00000E+00, A4 = −1.71767E−05, A6 = −9.10564E−09, A8 = 3.20544E−11, A10 = −1.34028E−14, A12 = 0.00000E+00, A14 = 0.00000E+00

$2^{nd}$ surface

K = −4.51869E−01, A4 = −2.17452E−05, A6 = −1.14085E−07, A8 = −2.85513E−10, A10 = 0.00000E+00, A12 = 0.00000E+00, A14 = 0.00000E+00

$3^{rd}$ surface

K = 5.87632E−01, A4 = −8.91572E−05, A6 = 9.11132E−08, A8 = 2.64445E−09, A10 = −2.86910E−11, A12 = 1.16339E−13, A14 = −1.79352E−16

$4^{th}$ surface

K = −9.31057E−01, A4 = −4.28320E−05, A6 = −1.49742E−07, A8 = 1.35356E−08, A10 = −1.43954E−10, A12 = 7.62574E−13, A14 = −1.78389E−15

$18^{th}$ surface

K = 0.00000E+00, A4 = −6.67442E−05, A6 = 1.14963E−07, A8 = −2.25533E−09, A10 = 7.84380E−11, A12 = 0.00000E+00, A14 = 0.00000E+00

$19^{th}$ surface

K = 0.00000E+00, A4 = −5.46366E−06, A6 = −8.22762E−08, A8 = −2.29460E−09, A10 = −3.51939E−11, A12 = 7.14245E−13, A14 = 0.00000E+00

$29^{th}$ surface

K = 0.00000E+00, A4 = 7.26685E−06, A6 = 1.99449E−08, A8 = −1.38874E−10, A10 = 8.19221E−13, A12 = 0.00000E+00, A14 = 0.00000E+00

(Various types of data in infinity in-focus state)

TABLE 6A

| (Various types of data) Zoom ratio: 1.85001 | | | |
| --- | --- | --- | --- |
| | Wide-angle | Middle | Telephoto |
| Focal length | 12.4799 | 16.9909 | 23.0880 |
| F number | 4.14066 | 4.73773 | 5.51285 |
| Angle of view | 60.8476 | 51.1872 | 42.3497 |
| Image height | 20.0000 | 20.5000 | 21.0000 |
| Total lens length | 109.2998 | 105.5044 | 106.6403 |
| BF | 0.04049 | 0.04049 | −0.03948 |
| d8 | 20.3564 | 9.6660 | 1.5209 |
| d21 | 2.7464 | 2.0230 | 1.4949 |
| d25 | 6.7008 | 8.0133 | 7.3886 |
| d29 | 13.0895 | 19.3954 | 29.9092 |
| Entrance pupil position | 16.6246 | 15.3213 | 13.9308 |
| Exit pupil position | −50.6240 | −58.1702 | −67.9322 |
| Anterior principal point | 26.0304 | 27.3528 | 29.1674 |
| Posterior principal point | 96.8198 | 88.5135 | 83.5523 |

TABLE 6B

| (Data about single lenses) | | |
| --- | --- | --- |
| Lens | Start surface | Focal length |
| 1 | 1 | −28.0769 |
| 2 | 3 | −41.6201 |
| 3 | 5 | −44.3099 |
| 4 | 7 | 31.9409 |
| 5 | 10 | −16.0302 |
| 6 | 12 | 8.3394 |
| 7 | 14 | −8.1436 |
| 8 | 16 | 28.3960 |
| 9 | 18 | 18.8592 |
| 10 | 20 | 56.5917 |
| 11 | 22 | 22.6020 |

TABLE 6B-continued

| (Data about single lenses) | | |
| --- | --- | --- |
| Lens | Start surface | Focal length |
| 12 | 24 | −13.3954 |
| 13 | 26 | 32.7591 |
| 14 | 28 | −33.5366 |

TABLE 6C

| (Data about zoom lens groups) | | | | | |
| --- | --- | --- | --- | --- | --- |
| Group | Start surface | Focal length | Lens configuration length | Anterior principal point | Posterior principal point |
| 1 | 1 | −21.05340 | 27.98280 | 2.29923 | 3.51249 |
| 2 | 9 | 19.29298 | 21.27860 | 12.94107 | 16.79278 |
| 3 | 22 | −35.81010 | 4.45230 | 3.45628 | 5.51360 |
| 4 | 26 | −1084.80184 | 9.55250 | −51.37194 | −51.04830 |

TABLE 6D

| (Zoom powers of zoom lens groups) | | | | |
| --- | --- | --- | --- | --- |
| Group | Start surface | Wide-angle | Middle | Telephoto |
| 1 | 1 | 0.00000 | 0.00000 | 0.00000 |
| 2 | 9 | −0.32410 | −0.39504 | −0.47411 |
| 3 | 22 | 1.70908 | 1.89866 | 2.13066 |
| 4 | 26 | 1.07017 | 1.07598 | 1.08560 |

Third Example of Numerical Values

Following is a third exemplary set of numerical values for the zoom lens system corresponding to the third embodiment shown in FIG. 5. Specifically, as the third example of numerical values for the zoom lens system, surface data is shown in Table 7, aspheric surface data is shown in Table 8, and various types of data in the infinity in-focus state are shown in Tables 9A-9D:

TABLE 7

| | (Surface data) | | | |
|---|---|---|---|---|
| Surface No. | r | d | nd | vd |
| Object surface | ∞ | | | |
| 1 | 51.27830 | 1.50000 | 1.80420 | 46.5 |
| 2 | 17.16120 | 3.97510 | | |
| 3* | 22.57360 | 3.40000 | 1.53380 | 55.6 |
| 4* | 10.64080 | 8.67830 | | |
| 5 | −58.71100 | 1.20000 | 1.59283 | 68.6 |
| 6 | 42.33500 | 0.31910 | | |
| 7 | 27.71190 | 4.19590 | 1.67960 | 31.6 |
| 8 | −70.14090 | Variable | | |
| 9 (aperture) | ∞ | 1.40000 | | |
| 10 | 15.55630 | 1.50000 | 1.77687 | 49.5 |
| 11 | 7.43830 | 0.01000 | 1.56732 | 42.8 |
| 12 | 7.43830 | 4.94930 | 1.69977 | 40.7 |
| 13 | −24.23300 | 0.84200 | | |
| 14 | −17.41160 | 0.60000 | 2.00100 | 29.1 |
| 15 | 14.82390 | 0.01000 | 1.56732 | 42.8 |
| 16 | 14.82390 | 2.97270 | 1.49700 | 81.6 |
| 17 | −48.54780 | 0.20000 | | |
| 18* | 75.22590 | 6.50880 | 1.55332 | 71.7 |
| 19* | −13.22810 | 0.20000 | | |
| 20 | 330.81960 | 1.97000 | 1.79808 | 21.6 |
| 21 | −43.80640 | Variable | | |
| 22 | 249.36460 | 3.99360 | 1.94595 | 18.0 |
| 23 | −22.33140 | 0.01000 | 1.56732 | 42.8 |
| 24 | −22.33140 | 0.60000 | 1.92119 | 24.0 |
| 25 | 22.66180 | Variable | | |
| 26 | −65.59350 | 8.21740 | 1.59283 | 68.6 |
| 27 | −13.67780 | 0.01000 | 1.56732 | 42.8 |
| 28 | −13.67780 | 1.20000 | 1.82937 | 39.4 |
| 29 | −40.50580 | Variable | | |
| 30 | ∞ | 2.10000 | 1.51680 | 64.2 |
| 31 | ∞ | 1.00000 | | |
| 32 | ∞ | BF | | |
| Image plane | ∞ | | | |

TABLE 8

(Aspheric surface data)

3$^{rd}$ surface

K = 3.62278E−01, A4 = −1.03419E−05, A6 = −4.28353E−08, A8 = 1.31865E−09, A10 = −1.51096E−11, A12 = 6.52429E−14, A14 = −1.02684E−16

4$^{th}$ surface

K = −9.50528E−01, A4 = 2.61201E−05, A6 = −3.58785E−07, A8 = 1.20063E−08, A10 = −1.65948E−10, A12 = 9.98254E−13, A14 = −2.26681E−15

18$^{th}$ surface

K = 0.00000E+00, A4 = −6.96842E−05, A6 = −2.72178E−09, A8 = 2.72327E−09, A10 = 2.23474E−11, A12 = 0.00000E+00, A14 = 0.00000E+00

19$^{th}$ surface

K = 0.00000E+00, A4 = 1.77423E−06, A6 = −8.19141E−08, A8 = −3.97632E−09, A10 = 4.81693E−11, A12 = −3.57031E−13, A14 = 0.00000E+00

(Various types of data in infinity in-focus state)

TABLE 9A

| (Various types of data) Zoom ratio: 2.02737 | | | |
|---|---|---|---|
| | Wide-angle | Middle | Telephoto |
| Focal length | 16.6464 | 23.7126 | 33.7484 |
| F number | 4.52204 | 5.41018 | 6.65977 |

TABLE 9A-continued

| (Various types of data) Zoom ratio: 2.02737 | | | |
|---|---|---|---|
| | Wide-angle | Middle | Telephoto |
| Angle of view | 53.3567 | 41.9422 | 32.3066 |
| Image height | 20.0000 | 20.5000 | 21.0000 |
| Total lens length | 107.0564 | 104.8055 | 109.4800 |
| BF | 0.05659 | 0.04133 | −0.09295 |
| d8 | 21.0889 | 10.0595 | 2.1989 |
| d21 | 2.6476 | 2.1578 | 1.8170 |
| d25 | 8.3011 | 9.9207 | 10.0400 |
| d29 | 13.4000 | 21.0640 | 33.9549 |
| Entrance pupil position | 16.2533 | 14.4804 | 12.7296 |
| Exit pupil position | −46.4922 | −55.4118 | −68.3648 |
| Anterior principal point | 26.9468 | 28.0531 | 29.7953 |
| Posterior principal point | 90.4100 | 81.0930 | 75.7317 |

TABLE 9B

| Data about single lenses | | |
|---|---|---|
| Lens | Start surface | Focal length |
| 1 | 1 | −32.7146 |
| 2 | 3 | −41.8607 |
| 3 | 5 | −41.3102 |
| 4 | 7 | 29.7450 |
| 5 | 10 | −19.9601 |
| 6 | 12 | 8.6924 |
| 7 | 14 | −7.9251 |
| 8 | 16 | 23.2113 |
| 9 | 18 | 20.8789 |
| 10 | 20 | 48.5848 |
| 11 | 22 | 21.8231 |
| 12 | 24 | −12.1324 |
| 13 | 26 | 27.5291 |
| 14 | 28 | −25.4152 |

TABLE 9C

| Data about zoom lens groups | | | | | |
|---|---|---|---|---|---|
| Group | Start surface | Focal length | Lens configuration length | Anterior principal point | Posterior principal point |
| 1 | 1 | −24.90712 | 23.26840 | 0.48513 | 1.38288 |
| 2 | 9 | 18.67265 | 21.16280 | 12.99812 | 15.87602 |

TABLE 9C-continued

| | | | Lens configuration length | Anterior principal point | Posterior principal point |
|---|---|---|---|---|---|
| Group | Start surface | Focal length | | | |
| 3 | 22 | −28.27254 | 4.60360 | 2.66225 | 4.87065 |
| 4 | 26 | −187.13619 | 9.42740 | −5.81087 | −2.63802 |

Data about zoom lens groups

TABLE 9D

Zoom powers of zoom lens groups

| Group | Start surface | Wide-angle | Middle | Telephoto |
|---|---|---|---|---|
| 1 | 1 | 0.00000 | 0.00000 | 0.00000 |
| 2 | 9 | −0.30017 | −0.36486 | −0.43107 |
| 3 | 22 | 1.93760 | 2.19272 | 2.49830 |
| 4 | 26 | 1.14912 | 1.19000 | 1.25816 |

Fourth Example of Numerical Values

Following is a fourth exemplary set of numerical values for the zoom lens system corresponding to the fourth embodiment shown in FIG. 7. Specifically, as the fourth example of numerical values for the zoom lens system, surface data is shown in Table 10, aspheric surface data is shown in Table 11, and various types of data in the infinity in-focus state are shown in Tables 12A-12D:

TABLE 10

Surface data

| Surface No. | r | d | nd | vd |
|---|---|---|---|---|
| Object surface | ∞ | | | |
| 1 | 48.75960 | 1.50000 | 1.80420 | 46.5 |
| 2 | 16.60630 | 4.54790 | | |
| 3* | 22.92980 | 3.40000 | 1.53380 | 55.6 |
| 4* | 10.77690 | 8.98930 | | |
| 5 | −58.95000 | 1.20000 | 1.55032 | 75.5 |
| 6 | 40.04970 | 0.39210 | | |
| 7 | 27.32440 | 5.26860 | 1.67179 | 32.5 |
| 8 | −75.56430 | Variable | | |
| 9 (aperture) | ∞ | 1.40000 | | |
| 10 | 16.90390 | 1.50000 | 1.77468 | 49.6 |
| 11 | 7.36980 | 0.01000 | 1.56732 | 42.8 |

TABLE 10-continued

Surface data

| Surface No. | r | d | nd | vd |
|---|---|---|---|---|
| 12 | 7.36980 | 6.24460 | 1.70096 | 40.5 |
| 13 | −21.20110 | 0.66600 | | |
| 14 | −16.25310 | 0.60000 | 2.00100 | 29.1 |
| 15 | 15.81560 | 0.01000 | 1.56732 | 42.8 |
| 16 | 15.81560 | 3.32480 | 1.49700 | 81.6 |
| 17 | −62.24720 | 0.20000 | | |
| 18* | 53.44500 | 6.15130 | 1.55332 | 71.7 |
| 19* | −13.06570 | 0.20000 | | |
| 20 | 3820.62700 | 1.97000 | 1.80859 | 21.2 |
| 21 | −48.94650 | Variable | | |
| 22 | 85.67040 | 3.88480 | 1.94595 | 18.0 |
| 23 | −30.01470 | 0.01000 | 1.56732 | 42.8 |
| 24 | −30.01470 | 0.60000 | 1.92119 | 24.0 |
| 25 | 21.95940 | Variable | | |
| 26 | −72.52150 | 7.62360 | 1.49700 | 81.6 |
| 27 | −13.43250 | 0.01000 | 1.56732 | 42.8 |
| 28 | −13.43250 | 1.20000 | 1.80977 | 39.1 |
| 29 | −34.82680 | Variable | | |
| 30 | ∞ | 2.10000 | 1.51680 | 64.2 |
| 31 | ∞ | 1.00000 | | |
| 32 | ∞ | BF | | |
| Image plane | ∞ | | | |

TABLE 11

Aspheric surface data

3rd surface

K = 7.15825E−01, A4 = 1.05161E−05, A6 = −3.09736E−07, A8 = 2.94723E−09, A10 = −1.93650E−11, A12 = 6.35702E−14, A14 = −8.63961E−17

4th surface

K = −9.78880E−01, A4 = 5.61681E−05, A6 = −8.03315E−07, A8 = 1.34503E−08, A10 = −1.35345E−10, A12 = 6.64907E−13, A14 = −1.29626E−15

18th surface

K = 0.00000E+00, A4 = −6.58156E−05, A6 = 2.97967E−08, A8 = 4.04693E−10, A10 = 2.63005E−11, A12 = 0.00000E+00, A14 = 0.00000E+00

19th surface

K = 0.00000E+00, A4 = 1.30499E−06, A6 = −1.15348E−07, A8 = −2.18299E−09, A10 = 5.65877E−12, A12 = −4.64060E−14, A14 = 0.00000E+00

(Various types of data in infinity in-focus state)

TABLE 12A

Various types of data
Zoom ratio: 1.84944

| | Wide-angle | Middle | Telephoto |
|---|---|---|---|
| Focal length | 15.5979 | 21.2237 | 28.8472 |
| F number | 4.14018 | 4.81716 | 5.75437 |
| Angle of view | 55.1198 | 45.3915 | 36.7659 |
| Image height | 20.0000 | 20.5000 | 21.0000 |
| Total lens length | 108.8289 | 105.6922 | 108.4207 |
| BF | 0.02197 | 0.03879 | −0.06778 |
| d8 | 20.7934 | 10.4149 | 2.9480 |
| d21 | 2.8127 | 2.1447 | 1.5480 |
| d25 | 6.8185 | 8.3103 | 8.5064 |
| d29 | 14.3793 | 20.7805 | 31.4831 |
| Entrance pupil position | 16.3617 | 14.8071 | 13.3089 |
| Exit pupil position | −46.5703 | −54.0039 | −64.7844 |
| Anterior principal point | 26.7379 | 27.6958 | 29.2975 |
| Posterior principal point | 93.2310 | 84.4685 | 79.5735 |

TABLE 12B

| | Data about single lenses | |
|---|---|---|
| Lens | Start surface | Focal length |
| 1 | 1 | −31.9794 |
| 2 | 3 | −42.2010 |
| 3 | 5 | −43.1486 |
| 4 | 7 | 30.4999 |
| 5 | 10 | −18.1109 |
| 6 | 12 | 8.5742 |
| 7 | 14 | −7.9334 |
| 8 | 16 | 25.7390 |
| 9 | 18 | 19.6210 |
| 10 | 20 | 59.7811 |
| 11 | 22 | 23.8874 |
| 12 | 24 | −13.6906 |
| 13 | 26 | 31.8088 |
| 14 | 28 | −27.6980 |

TABLE 12C

| | | | Data about zoom lens groups | | |
|---|---|---|---|---|---|
| Group | Start surface | Focal length | Lens configuration length | Anterior principal point | Posterior principal point |
| 1 | 1 | −25.16635 | 25.29790 | 0.18932 | 0.83849 |
| 2 | 9 | 19.80010 | 22.27670 | 13.63232 | 17.01415 |
| 3 | 22 | −34.46685 | 4.49480 | 3.29209 | 5.38725 |
| 4 | 26 | −156.00279 | 8.83360 | −2.66934 | 0.17519 |

TABLE 12D

| | | Zoom powers of zoom lens groups | | |
|---|---|---|---|---|
| Group | Start surface | Wide-angle | Middle | Telephoto |
| 1 | 1 | 0.00000 | 0.00000 | 0.00000 |
| 2 | 9 | −0.30817 | −0.36753 | −0.42667 |
| 3 | 22 | 1.72919 | 1.90542 | 2.11178 |
| 4 | 26 | 1.16310 | 1.20424 | 1.27216 |

Fifth Example of Numerical Values

Following is a fifth exemplary set of numerical values for the zoom lens system corresponding to the fifth embodiment shown in FIG. 9. Specifically, as the fifth example of numerical values for the zoom lens system, surface data is shown in Table 13, aspheric surface data is shown in Table 14, and various types of data in the infinity in-focus state are shown in Tables 15A-15D:

TABLE 13

| | | Surface data | | |
|---|---|---|---|---|
| Surface No. | r | d | nd | vd |
| Object surface | ∞ | | | |
| 1 | 34.92850 | 1.50000 | 1.80420 | 46.5 |
| 2 | 15.46540 | 6.93180 | | |
| 3* | 21.96490 | 3.40000 | 1.53380 | 55.6 |
| 4* | 10.45080 | 8.59270 | | |
| 5 | −47.66650 | 1.20000 | 1.59283 | 68.6 |
| 6 | 63.84170 | 0.28490 | | |
| 7 | 32.72170 | 4.95840 | 1.68897 | 32.7 |
| 8 | −70.65740 | Variable | | |
| 9 (aperture) | ∞ | 1.40000 | | |
| 10 | 17.01220 | 1.50000 | 1.78037 | 49.3 |
| 11 | 7.84840 | 0.01000 | 1.56732 | 42.8 |
| 12 | 7.84840 | 6.56510 | 1.70032 | 38.2 |
| 13 | −23.62350 | 0.69140 | | |
| 14 | −18.31780 | 0.60000 | 2.00100 | 29.1 |
| 15 | 15.30900 | 0.01000 | 1.56732 | 42.8 |
| 16 | 15.30900 | 3.14470 | 1.49700 | 81.6 |
| 17 | −37.10090 | 0.20000 | | |
| 18* | 69.24160 | 7.00000 | 1.55332 | 71.7 |
| 19* | −13.93430 | 0.20000 | | |
| 20 | −121.57720 | 1.97000 | 1.81076 | 21.2 |
| 21 | −47.68260 | Variable | | |
| 22 | 57.70310 | 4.02350 | 1.94595 | 18.0 |
| 23 | −36.46570 | 0.01000 | 1.56732 | 42.8 |
| 24 | −36.46570 | 0.60000 | 1.92119 | 24.0 |
| 25 | 21.57890 | Variable | | |
| 26 | −48.34840 | 4.47300 | 1.49700 | 81.6 |
| 27 | −14.79700 | 0.01000 | 1.56732 | 42.8 |
| 28 | −14.79700 | 1.20000 | 1.73051 | 42.8 |
| 29 | −42.78950 | Variable | | |
| 30 | ∞ | 2.10000 | 1.51680 | 64.2 |
| 31 | ∞ | 1.00000 | | |
| 32 | ∞ | BF | | |
| Image plane | ∞ | | | |

TABLE 14

| Aspheric surface data |
|---|
| 3rd surface |
| K = 6.94863E−01, A4 = −4.58044E−05, A6 = 3.45604E−08, A8 = 1.48591E−09, A10 = −1.80165E−11, A12 = 7.56922E−14, A14 = −1.21023E−16 |
| 4th surface |
| K = −1.00000E+00, A4 = −1.36862E−05, A6 = −2.37671E−07, A8 = 1.04270E−08, A10 = −1.38773E−10, A12 = 7.83286E−13, A14 = −1.70391E−15 |
| 18th surface |
| K = 0.00000E+00, A4 = −5.95627E−05, A6 = 1.08609E−07, A8 = −3.00988E−09, A10 = 5.14408E−11, A12 = 0.00000E+00, A14 = 0.00000E+00 |
| 19th surface |
| K = 0.00000E+00, A4 = −3.42969E−06, A6 = −8.15414E−08, A8 = −2.42088E−09, A10 = 1.33291E−11, A12 = −1.09981E−13, A14 = 0.00000E+00 |

(Various types of data in infinity in-focus state)

TABLE 15A

| | Various types of data<br>Zoom ratio:1.73437 | | |
|---|---|---|---|
| | Wide-angle | Middle | Telephoto |
| Focal length | 16.6403 | 21.1716 | 28.8604 |
| F number | 4.14052 | 4.76819 | 5.61270 |
| Angle of view | 53.3628 | 45.9771 | 36.7673 |
| Image height | 20.0000 | 20.5000 | 21.0000 |
| Total lens length | 113.4112 | 113.3257 | 113.3954 |
| BF | 0.04079 | −0.03883 | 0.01586 |
| d8 | 22.3901 | 15.5696 | 6.6595 |
| d21 | 3.1934 | 2.3055 | 1.7003 |
| d25 | 8.3106 | 8.2756 | 11.9317 |
| d29 | 15.9008 | 23.6383 | 29.5125 |
| Entrance pupil position | 18.0634 | 17.1317 | 15.5666 |
| Exit pupil position | −46.0751 | −53.6649 | −61.7988 |
| Anterior principal point | 28.6993 | 29.9447 | 30.9525 |
| Posterior principal point | 96.7709 | 92.1541 | 84.5350 |

TABLE 15B

| | Data about single lenses | |
|---|---|---|
| Lens | Start surface | Focal length |
| 1 | 1 | −35.7394 |
| 2 | 3 | −41.6259 |
| 3 | 5 | −45.8509 |
| 4 | 7 | 33.1086 |
| 5 | 10 | −20.1139 |
| 6 | 12 | 9.2028 |
| 7 | 14 | −8.2573 |
| 8 | 16 | 22.2486 |
| 9 | 18 | 21.6121 |
| 10 | 20 | 95.6216 |
| 11 | 22 | 24.1227 |
| 12 | 24 | −14.6439 |
| 13 | 26 | 41.0849 |
| 14 | 28 | −31.5338 |

TABLE 15C

| | | | Data about zoom lens groups | | |
|---|---|---|---|---|---|
| Group | Start surface | Focal length | Lens configuration length | Anterior principal point | Posterior principal point |
| 1 | 1 | −24.85488 | 26.86780 | 1.94070 | 3.36710 |
| 2 | 9 | 21.75039 | 23.29120 | 13.42319 | 16.85921 |
| 3 | 22 | −41.74141 | 4.63350 | 4.19516 | 6.27765 |
| 4 | 26 | −115.82498 | 5.68300 | −1.88736 | −0.01789 |

TABLE 15D

| | Zoom powers of zoom lens groups | | | |
|---|---|---|---|---|
| Group | Start surface | Wide-angle | Middle | Telephoto |
| 1 | 1 | 0.00000 | 0.00000 | 0.00000 |
| 2 | 9 | −0.34846 | −0.39121 | −0.46587 |
| 3 | 22 | 1.59122 | 1.70968 | 1.88146 |
| 4 | 26 | 1.20744 | 1.27356 | 1.32475 |

(Values Corresponding to Inequalities)

Values, corresponding to the inequalities (1) to (6), of the respective examples of numerical values are shown in the following Table 16:

| Inequality | | $1^{st}$ example of numerical values | $2^{nd}$ example of numerical values | $3^{rd}$ example of numerical values | $4^{th}$ example of numerical values | $5^{th}$ example of numerical values |
|---|---|---|---|---|---|---|
| fw/BFw | (1) | 0.9207 | 0.8044 | 1.0508 | 0.9292 | 0.9080 |
| νd1 | (2) L2 | | 67.00 | | | |
| | L3 | 68.60 | 68.60 | 68.60 | 75.50 | 68.60 |
| DL1/DL2 | (3) | 0.44 | 0.80 | 0.44 | 0.44 | 0.44 |
| \|fG3/fG2\| | (4) | 1.81 | 1.86 | 1.51 | 1.74 | 1.92 |
| νG3p | (5) | 18.00 | 18.00 | 18.00 | 18.00 | 18.00 |
| νG4p | (6) | 81.60 | 81.60 | 68.60 | 81.60 | 81.60 |

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

The zoom lens system according to the present disclosure is applicable to various types of cameras including digital still cameras, digital cameras, of which the lens is interchangeable, digital camcorders, cameras for cellphones and smartphones, and cameras for personal digital assistants (PDAs), surveillance cameras for surveillance systems, Web cameras, and onboard cameras. Among other things, the present disclosure is particularly suitably applicable as a zoom lens system for imaging optical systems that are required to provide high image quality such as digital still camera systems and digital camcorder systems.

The invention claimed is:

1. A zoom lens system comprising multiple lens groups and an aperture stop, the multiple lens groups consisting of:

a first lens group having negative power;

a second lens group having positive power;

a third lens group having negative power; and a fourth lens group having negative power, the first, second, third, and fourth lens groups being arranged in this order such that the first lens group is located closer to an object than any of the second, third, or fourth lens group is, and that the fourth lens group is located closer to an image plane than any of the first, second, or third lens group is, the aperture stop being disposed between the first lens group and the second lens group, an interval between each pair of lens groups that are adjacent to each other among the multiple lens groups changing as the first, second, third, and fourth lens groups move along an optical axis of the zoom lens system while the zoom lens system is zooming, the third lens group being configured to move along the optical axis while the zoom lens system is focusing to make a transition from an infinity in-focus state toward a close-object in-focus state, and the zoom lens system satisfying the following inequality (1):

$$0.5 < fw/BFw < 1.5 \qquad (1)$$

where fw is a focal length of the zoom lens system at a wide-angle end,

BFw is a back focus of the zoom lens system at the wide-angle end, a lens located closest to the object among the second lens group being a negative lens, and the second lens group further including a positive lens located closer to the image plane than the negative lens, the positive lens and the negative lens being bonded together to form a bonded lens.

2. The zoom lens system of claim 1, wherein the aperture stop is configured to move along the optical axis together with the second lens group while the zoom lens system is zooming.

3. The zoom lens system of claim 1, wherein the first lens group is configured to move to draw a locus that is convex toward the image plane while the zoom lens system is zooming.

4. The zoom lens system of claim 1, wherein the first lens group includes a plurality of lenses, the plurality of lenses comprising:

a negative lens G1L1 located closest to the object among the plurality of lenses;

a negative lens G1L2 located second closest to the object among the plurality of lenses; and a negative lens G1L3 located third closest to the object among the plurality of lenses, and the zoom lens system satisfies the following inequality (2):

$$65 < vd1 < 100 \qquad (2)$$

where vd1 is an abbe number of at least one negative lens, selected from the group consisting of the negative lens G1L1, the negative lens G1L2, and the negative lens GIL3, in response to a d-line.

5. The zoom lens system of claim 4, wherein the zoom lens system satisfies the following inequality (3):

$$0.1 < DL1/DL2 < 0.9 \qquad (3)$$

where DL1 is a thickness of the negative lens G1L1 as measured along the optical axis, and DL2 is a thickness of the negative lens G1L2 as measured along the optical axis.

6. The zoom lens system of claim 1, wherein the zoom lens system satisfies the following inequality (4):

$$0.5 < |fG3/fG2| < 2.5 \qquad (4)$$

where fG2 is a focal length of the second lens group, and fG3 is a focal length of the third lens group.

7. The zoom lens system of claim 1, wherein the third lens group includes at least one positive lens LG3p that satisfies the following inequality (5):

$$14 < vG3p < 35 \qquad (5)$$

where vG3p is an abbe number of the at least one positive lens LG3p in response to a d-line.

8. The zoom lens system of claim 1, wherein the fourth lens group includes at least one positive lens LG4p that satisfies the following inequality (6):

$$65 < vG4p < 100 \qquad (6)$$

where vG4p is an abbe number of the at least one positive lens LG4p in response to a d-line.

9. An image capture device configured to transform an optical image of an object into an electrical image signal and output the electrical image signal thus transformed, the image capture device comprising:

a zoom lens system configured to form the optical image of the object; and an image sensor configured to transform the optical image formed by the zoom lens system into the electrical image signal, the zoom lens system comprising multiple lens groups that consist of:

a first lens group having negative power;

a second lens group having positive power;

a third lens group having negative power; and a fourth lens group having negative power, the first, second, third, and fourth lens groups being arranged in this order such that the first lens group is located closer to the object than any of the second, third, or fourth lens group is, and that the fourth lens group is located closer to an image plane than any of the first, second, or third lens group is, an interval between each pair of lens groups that are adjacent to each other among the multiple lens groups changing as the first, second, third, and fourth lens groups move along an optical axis of the zoom lens system while the zoom lens system is zooming, the third lens group being configured to move along the optical axis while the zoom lens system is focusing to make a transition from an infinity in-focus state toward a close-object in-focus state, and the zoom lens system satisfying the following inequality (1):

$$0.5 < fw/BFw < 1.5 \qquad (1)$$

where fw is a focal length of the zoom lens system at a wide-angle end,

BFw is a back focus of the zoom lens system at the wide-angle end, a lens located closest to the object among the second lens group being a negative lens, and the second lens group further including a positive lens located closer to the image plane than the negative lens, the positive lens and the negative lens being bonded together to form a bonded lens.

10. An interchangeable lens unit configured to be removably connected, via a mount, to a camera body, the camera body including: an image sensor configured to receive an optical image and transform the optical image into an electrical image signal; and the mount, the interchangeable lens unit forming an optical image of an object on the image sensor, the interchangeable lens unit including a zoom lens system, the zoom lens system comprising multiple lens groups that consist of:

a first lens group having negative power;

a second lens group having positive power;

a third lens group having negative power; and a fourth lens group having negative power, the first, second, third, and fourth lens groups being arranged in this order such that the first lens group is located closer to the object than any of the second, third, or fourth lens group is, and that the fourth lens group is located closer to an image plane than any of the first, second, or third lens group is, an interval between each pair of lens groups that are adjacent to each other among the multiple lens groups changing as the first, second, third, and fourth lens groups move along an optical axis of the zoom lens system while the zoom lens system is zooming, the third lens group being configured to move along the optical axis while the zoom lens system is focusing to make a transition from an infinity in-focus state toward a close-object in-focus state, and the zoom lens system satisfying the following inequality (1):

$$0.5 < fw/BFw < 1.5 \qquad (1)$$

where fw is a focal length of the zoom lens system at a wide-angle end,

BFw is a back focus of the zoom lens system at the wide-angle end, a lens located closest to the object among the second lens group being a negative lens, and the second lens group further including a positive lens located closer to the image plane than the negative lens, the positive lens and the negative lens being bonded together to form a bonded lens.

* * * * *